(12) United States Patent
Nishijima et al.

(10) Patent No.: US 11,351,494 B2
(45) Date of Patent: Jun. 7, 2022

(54) CONTAINER ASSEMBLY

(71) Applicant: Brita LP, Oakland, CA (US)

(72) Inventors: Rick T. Nishijima, Pleasanton, CA (US); Madeline A. Donovan, Pleasanton, CA (US); Russell E. Bell, Pleasanton, CA (US); Piercy Yau, Causeway Bay (HK); Paul Anderson, Causeway Bay (HK); Simeon Jupp, Causeway Bay (HK)

(73) Assignee: BRITA LP, Oakland, CA (US)

( * ) Notice: Subject to any disclaimer, the term of this patent is extended or adjusted under 35 U.S.C. 154(b) by 0 days.

(21) Appl. No.: 17/008,494

(22) Filed: Aug. 31, 2020

(65) Prior Publication Data

US 2021/0008483 A1 Jan. 14, 2021

Related U.S. Application Data

(63) Continuation-in-part of application No. 16/801,891, filed on Feb. 26, 2020.

(60) Provisional application No. 62/812,704, filed on Mar. 1, 2019.

(51) Int. Cl.
  *B01D 46/00* (2022.01)
  *C02F 1/00* (2006.01)
  *B65D 47/06* (2006.01)
  *B65D 43/16* (2006.01)

(52) U.S. Cl.
  CPC ....... *B01D 46/0086* (2013.01); *B65D 43/163* (2013.01); *B65D 47/06* (2013.01); *C02F 1/003* (2013.01); *B65D 2203/12* (2013.01); *C02F 2209/445* (2013.01); *C02F 2307/04* (2013.01)

(58) Field of Classification Search
  CPC ............ B01D 46/0086; B65D 2203/12; B65D 43/163; B65D 47/06; B67D 2210/00005; B67D 2210/0001; B67D 2210/00036; B67D 3/0003; B67D 3/0061; B67D 3/0067; B67D 3/0077; B67D 3/04; B67D 3/043; C02F 1/003; C02F 1/283; C02F 2201/005; C02F 2201/006; C02F 2209/005; C02F 2209/445; C02F 2307/04
  See application file for complete search history.

(56) References Cited

U.S. PATENT DOCUMENTS

| | | | | |
|---|---|---|---|---|
| 6,491,879 | B2 * | 12/2002 | Conrad | C01B 13/11 |
| | | | | 422/186.18 |
| 7,487,677 | B2 * | 2/2009 | Chai | C02F 1/003 |
| | | | | 73/304 C |
| 9,505,633 | B2 * | 11/2016 | Bari | B01D 35/143 |
| 2011/0278467 | A1 * | 11/2011 | Tanaka | C02F 1/32 |
| | | | | 250/435 |
| 2012/0000858 | A1 * | 1/2012 | Butler | C02F 1/008 |
| | | | | 210/741 |

FOREIGN PATENT DOCUMENTS

GB 2441121 A * 2/2008 ............ C02F 1/003

* cited by examiner

*Primary Examiner* — Terry K Cecil
(74) *Attorney, Agent, or Firm* — Edell, Shapiro & Finnan, LLC

(57) ABSTRACT

A container assembly is disclosed. The container assembly includes a container that contains a volume. Selected portions of the container assembly may provide indication to a user of features or status of the container assembly.

25 Claims, 15 Drawing Sheets

CONTAINER ASSEMBLY

CROSS-REFERENCE TO RELATED APPLICATIONS

This application is a continuation-in-part of U.S. patent application Ser. No. 16/801,891, titled CONTAINER ASSEMBLY and filed on Feb. 26, 2020 which claims the benefit of U.S. Provisional Application No. 62/812,704, filed on Mar. 1, 2019. The entire disclosure(s) of (each of) the above application(s) is (are) incorporated herein by reference.

FIELD

The subject disclosure relates to a container, and particularly to a container including an indicator system.

BACKGROUND

This section provides background information related to the present disclosure which is not necessarily prior art.

A container may hold a volume of a fluid, such as liquid water, for a selected period of time. The container, however, may generally need to be accessed to allow for a fluid to be removed from the container at a selected period of time. Generally, for example, a lid of the container must be removed to access an interior of the container to access the fluid contained therein.

SUMMARY

This section provides a general summary of the disclosure, and is not a comprehensive disclosure of its full scope or all of its features.

A container may be formed of a selected material, such as a food suitable polymer, metal, and/or glass. The container may include a plurality of walls, such as walls to form side walls extending from a base to define an interior volume. The walls may also be formed at generally non-orthogonal angles relative to one another and/or curved relative to one another. Additionally, the container may include removable features, such as a lid or filling cover, to allow for ease of access to fill the container. In various embodiments, the container may include a bottom or lower wall from which side walls extend. The bottom wall may be positioned on a surface and/or have legs or protrusions extending therefrom.

The container assembly may include a first reservoir and a second reservoir. The first reservoir may be a pre-filter reservoir and the second reservoir may be a post-filter reservoir. The container may further include at least one removable lid portion for filling the pre-filter reservoir. A top lid or wall may also be provided through which the pre-filter reservoir may be filled.

The container system may include a filter assembly. The filter assembly may have a selected or preferred filter capacity which may be monitored. Monitoring the filter capacity may assist in ensuring optimal or selected filtering during use of the container assembly. The use of a lid may assist in monitoring the filter assembly and its lifespan.

An indicator may be provided with the container assembly for indicating a useful life of the filter assembly. The indicator may include a light indicator that displays a selected color based upon a current or projected lifespan of the filter assembly. In various embodiments, a light bulb may be provided that indicates or displays a selected color when using the container, such as filling the container, pouring a material from the container, or other selected uses of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
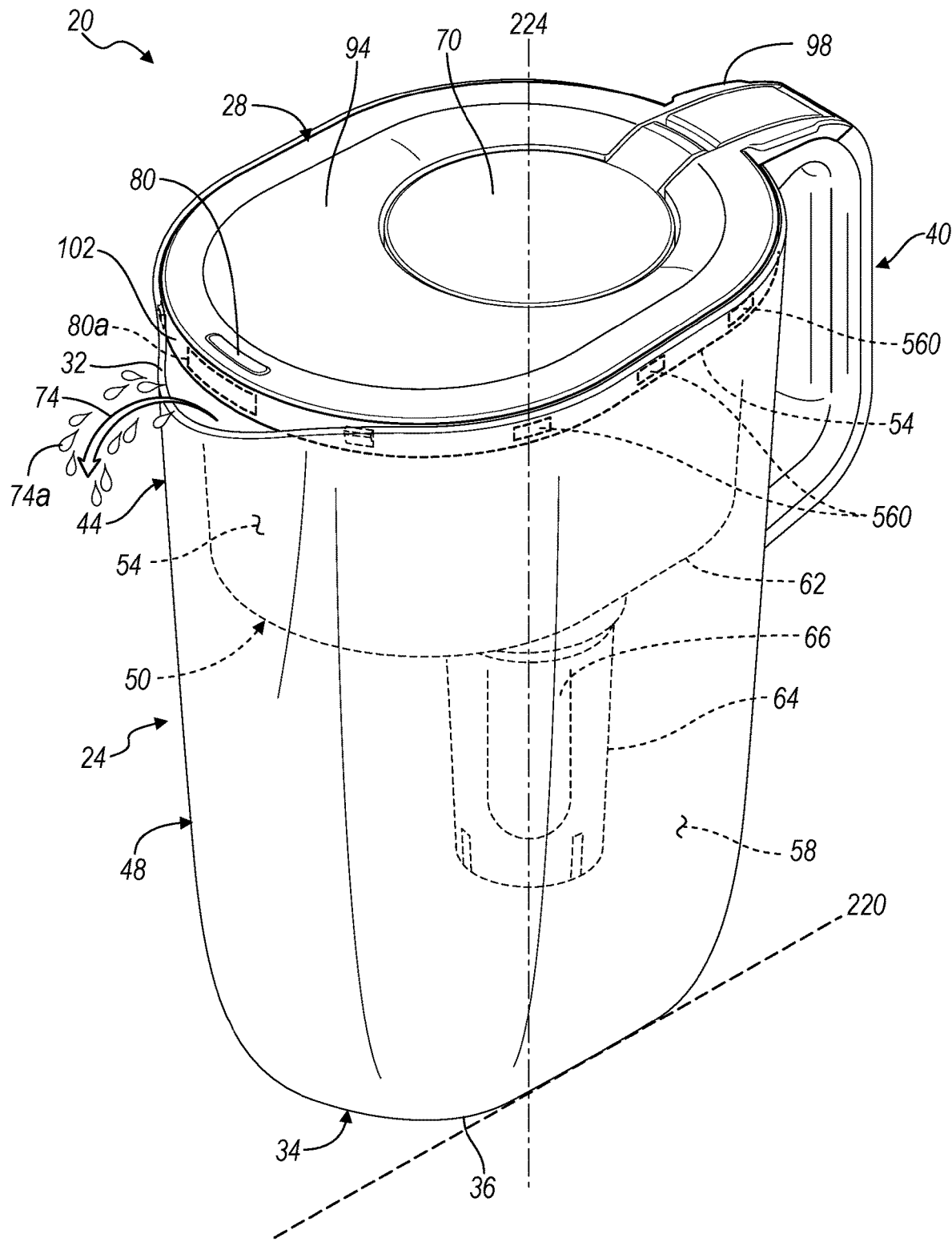
FIG. 1 is a perspective view of a container and lid assembly with a filter assembly, according to various embodiments.

With reference to FIG. 1, a container assembly 20 is illustrated. The container assembly 20 may include various components, such as a container 24 and a top lid assembly 28. The container may be an appropriate container that includes the lid assembly 28. Container 24 may include the containers included with the Monterey pitcher, the Soho pitcher, Grand pitcher, and other appropriate pitchers sold by Brita®, LP. The lid assembly 28 may cover a top or open portion of the container 24 such as being mounted or connected to a top edge or portion 32 of the container 24. The container 24 may extend from the top or first end 32 to a base, bottom wall, or second end 34 that may define a surface 36, which may be a base surface on which the container assembly 20 rests. The container assembly 20 may include various components to assist in use of the container assembly 20, such as a handle or graspable portion 40 and a pour spout 44.

The container 24 may include one or more sidewalls 48, such as defining an oval or cylinder that extends from the base or bottom wall 34. The handle 40 may extend from the sidewall 48 opposite the spout 44. Further, the container 24 may be divided into one or more regions such as by a reservoir or internal reservoir assembly 50. The reservoir 50 may divide the container 24 into a first or pre-filter volume 54 and a second or post-filter volume 58. The reservoir assembly 54 may include an internal structure, as discussed herein, which is positioned within the container 24. The reservoir 54 may further include a base or bottom wall 62 that may define a filter reservoir or holding portion 64. In various embodiments, therefore, a filter 66 may be positioned in the filter holder 64. The container 24 may then be filled in the reservoir volume 54 and the material may drain through the filter assembly 64 into the holding volume 58.

Figure 3:
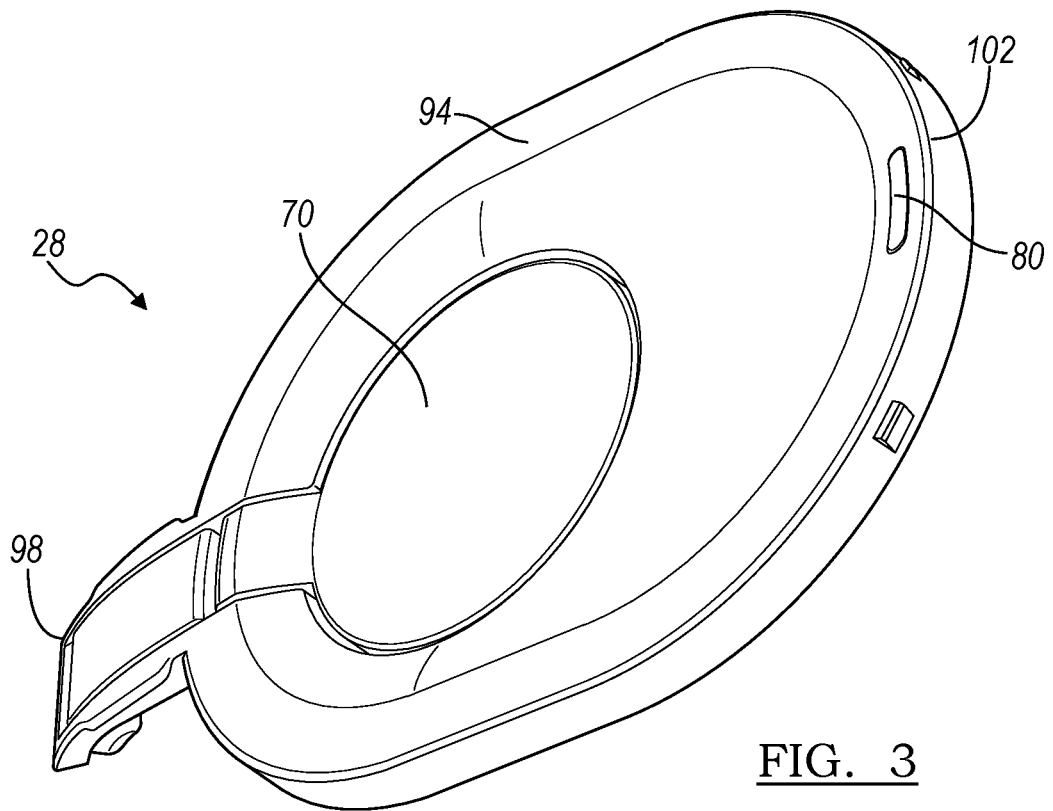
FIG. 3 is a top perspective view of a lid assembly with a closed fill lid, according to various embodiments.

The container assembly 20, in various embodiments, may include an openable or fill lid portion 70 that may be opened to allow material to enter the first or pre-filter volume 54. The fill lid 70 may be moveable relative to the top lid assembly 28. The fill lid 70, therefore, may be moveable between an open position as illustrated in FIGS. 1 and 3 and a closed position as illustrated in FIG. 3.

Liquid placed in the container 24, including in the prefilter volume 54, may include water which may filter through the filter 66 positioned in the filter holder 64. The water may pass through the filter 66 in the filter holder 64 to the post-filter volume 58. Thus, the container 24 may hold for a selected period of time the filtered water in the holding or post-filtered volume 58. At a selected time, a user may dispense a selected volume of the liquid from the post filter volume 58 through the spout 44. In various embodiments, the user may grasp the handle 40 and tilt the container 24 to cause a portion of the fluid to pass through the spout 44 generally in the direction of arrow 74. The liquid may be dispensed through the spout 44 from the post-filter volume 58 for use by the user, or an appropriate individual.

In various embodiments, the container assembly 20 may be used to assist for monitoring a filter positioned in the filter container 64. The container assembly 20 may include various components, such as those discussed further herein, to assist in measuring use of the filter 66 in the filter holder 64 and/or the water dispensed from the container assembly 20. In various embodiments, an indicator portion or member 80 may be provided in or through a portion of the lid 28 to provide an indication to the user or selected individual of a status of the filter 66. It is understood, however, the indicator 80 may alternatively and/or also provide a status of any appropriate portion of the container assembly 20, and not only the filter.

For example, the indicator 80 may indicate a flow of a liquid generally in the direction of arrow 74, a filtered amount (e.g. volume), a fill amount of the pre-filter reservoir volume 54, the post-filter reservoir 58, a rate of filtering, or other measurements. The indicator 80, therefore, may be provided to indicate various features and statuses of the container assembly 20.

As discussed further herein, however, the indicator 80 provides an indication of a status of a filter 66 positioned in the container assembly 20. The indicator 80 may include various features such as a visible light emission that may be viewable by a user, such as a human. The indicator 80 may also include various pulsing rates, light intensities, colors, and other light features to assist in providing different statuses of the filter 66. In various embodiments, the indicator 80 may include a length, and the indicator may be a light emitted in a movement along a length or portions of the indicator 80. Thus, the indicator 80 may provide an indication of a status of the filter 66 such as an efficacy of the filter 66, a lifespan of the filter 66, or other appropriate features.

Figure 2:
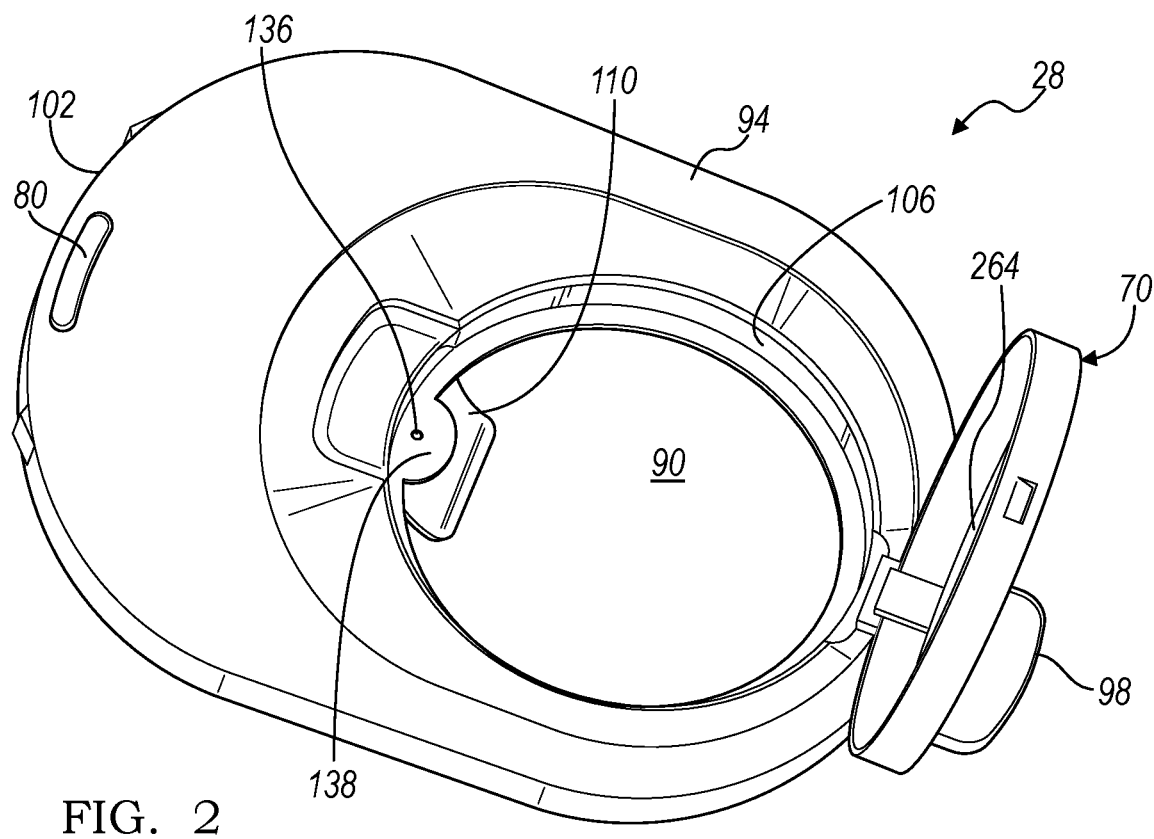
FIG. 2 is a top perspective view of a lid assembly with an open filling lid, according to various embodiments.

With continuing reference to FIG. 1 and additional reference to FIG. 2, the lid assembly 28 is illustrated in more detail. The lid assembly 28 includes the indicator bar or portion 80 and the fill lid 70. The fill lid 70 is movable from a closed position, as illustrated in FIG. 1, to an open position as illustrated in FIG. 2. The fill lid 70 allows access to the pre-filter volume 54 through an opening 90 in the lid assembly 28. The lid assembly 28, therefore, includes a fixed or generally fixed top lid portion or member 94. The top lid portion 94 may extend from a first end or handle region 98 to a forward wall 102. The forward wall 102 may be near or adjacent the spout 44. Accordingly, the flow of a fluid (e.g. a liquid including water) may generally be in the direction of arrow 74 and may flow past the wall 102 and near or adjacent to the indicator 80.

During use of the container assembly 20, the user may fill the pre-filter volume 54 through the opening 90 by opening the fill lid 70. Opening the fill lid 70 allows access through the opening 90 in the top wall or lid 94. The opening 90 may be defined by an internal wall 106 of the top lid 94. The internal wall 106 may also form or define a hinge portion for the fill lid 70 or other appropriate portion to assist in allowing the user to move the fill lid 70 relative to the fixed wall or lid portion 94. The lid assembly 28 may further include various indications, such as a fill line or indicator finger or projections 110 that may extend into the pre-filter volume 54. During use, the user may fill through the opening 90 into the pre-fill volume 54 until a volume of liquid, such as water, reaches the indicator on the fill indicator 110. The user, therefore, may understand that the pre-filled volume 54 has been filled to ensure a non-overflow status of the container assembly 20.

The lid assembly 28 may further include various components that allow for operation of the indicator 80. For example, a control or electronics module or assembly 120 may be mounted or fixed to an underside or selected surface 124 of the lid 94. The under surface 124 may generally face or be adjacent to the pre-filter volume 54 within the container assembly 20. The electronics module 120 may, therefore, be substantially water tight, such as hermetically sealed, relative to the environment under the lid member 94. The undersurface 124 may include various features, such as a wall or pocket 128 to engage or hold a selected portion of the electronics assembly 120. The pocket 128 may include various passages or through bores 132 to allow for access or exiting of water or liquid from around the electronics component 120.

The lid assembly 28 may include passages that allow for access to an exterior environment. For example, a through bore or hole 136 may be formed through a wall 138. The wall 138 may be covered by the fill lid 70, when the fill lid 70 is in a closed position. Accordingly, opening the fill lid 70 may allow for access or exposure of the hole or bore 136 to an exterior environment, such as exterior to the lid 94. In various embodiments, for example, a lens or transparent portion may be positioned over the bore or hole 136 such as formed through the wall 138 to allow for transmission of a selected wavelength, such as visible light.

The electronics module 120 may include a portion that extends relative to the lid member 94 to include a portion adjacent to the wall 138 and/or otherwise contained in the compartment or extension 128. Accordingly, various control and/or sensory portions may be positioned relative to the lid member 94 for sensing and/or controlling various features of the container assembly 20.

Figure 4A:
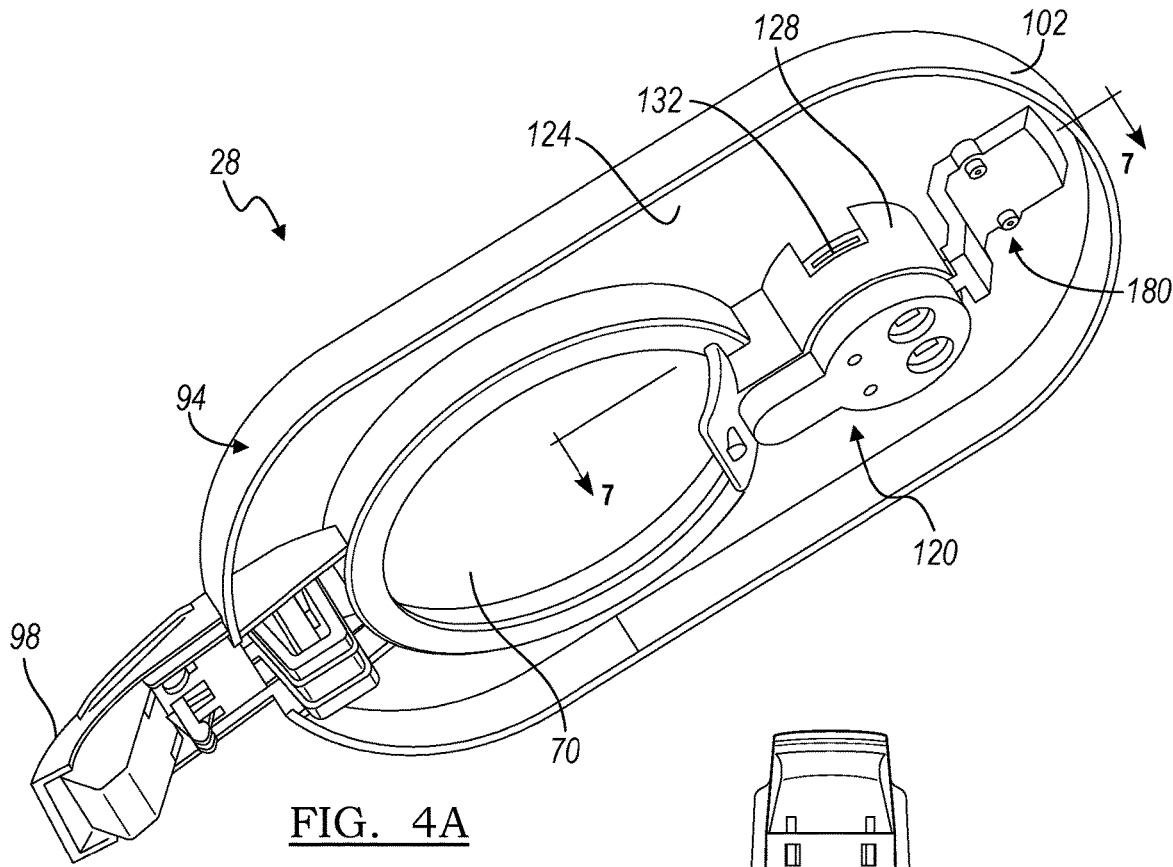
FIG. 4A is a bottom perspective view of a lid assembly with a closed fill lid, according to various embodiments.
Figure 4B:
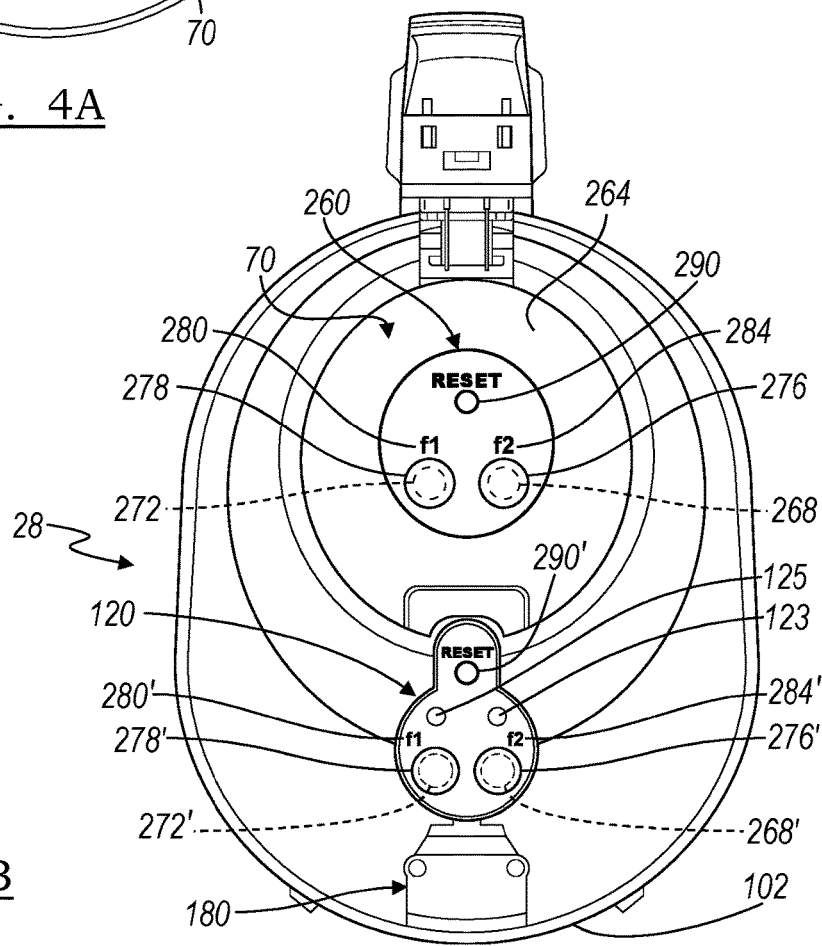
FIG. 4B is a bottom plan view of a lid assembly with a fill lid closed, according to various embodiments.
Figure 5:
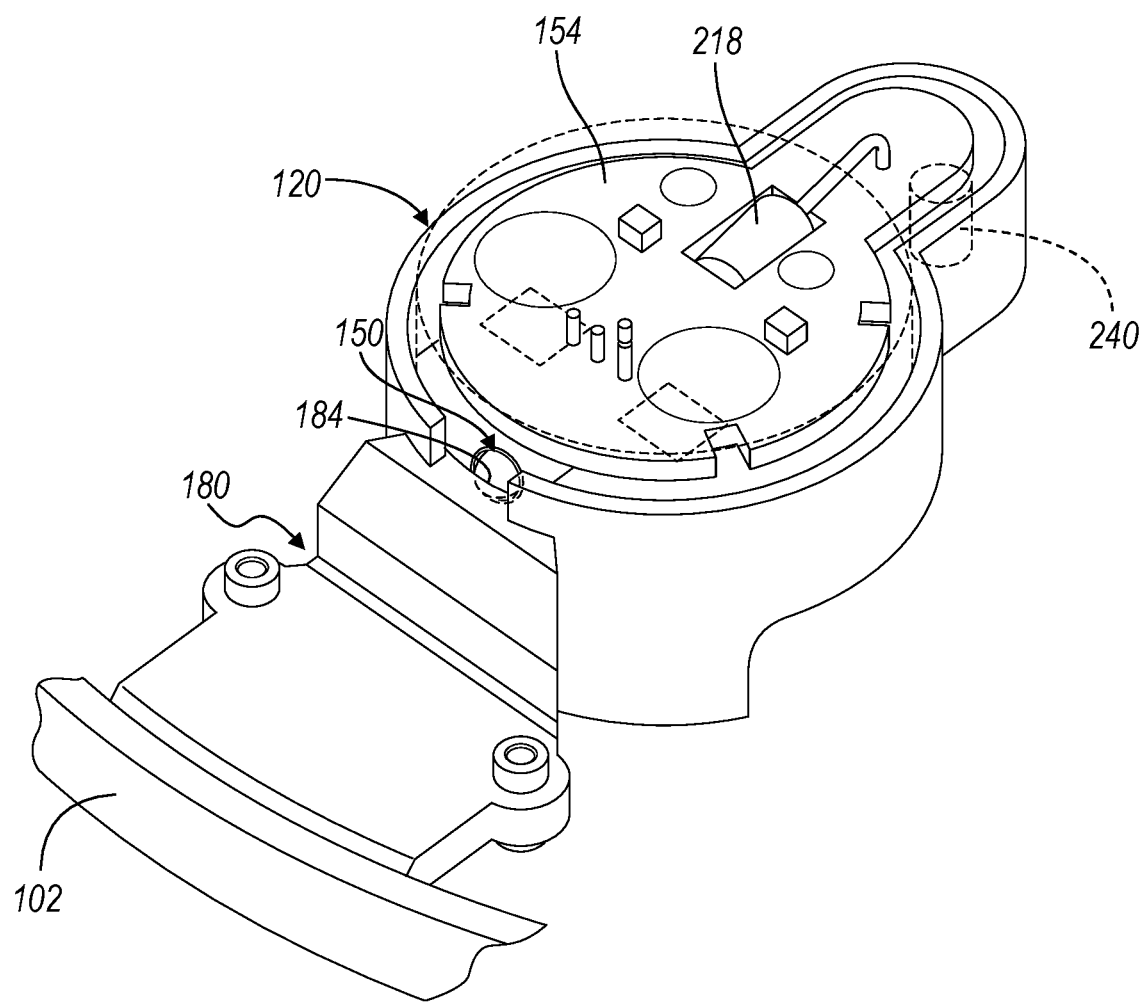
FIG. 5 is a detailed view of an electronics component package assembly and light guide.

With continuing reference to FIGS. 1-3 and additional reference to FIGS. 4A, 4B, and 5, the lid assembly 28 may include the electronics component 120. The electronics component 120 may include various portions, such as those discussed further herein. In various embodiments, the electronics component may include a light emitting element or diode 150. The light emitting diode 150 may be interconnected with a selected assembly, such as with a circuit board including a printed circuit board (PCB) 154. The PCB 154 may allow for communication and transmission of various signals to the LED 150 such as from a processor module 158 and power from an energy source 162, such as a selected battery component. A sealing portion 163, such as a silicone or rubberized seal, may optionally be provided around the power source 162. The various components the electronic module 120 may be encased within a selected casing 166 that may be selectively sealed relative to an exterior environment. The case 166 may include two portions, a top 166a and a bottom 166b that are sealed together around the electronics components. The casing 166, such as the top 166a, may include one or more projections or ears 167 that may be engaged by the lid to assist in holding the case 166 in a selected position.

In various embodiments, portions of the casing 166 may be transparent and/or have a sealed opening, these may be placed adjacent an emission portion 170 of the LED 150. The LED 150 may be a single color or a multi-colored (e.g. switchable among many colors) LED to emit a selected light or light energy from the LED 150. The LED, including the emission portion 170, may be positioned near or adjacent to a light pipe or energy conductor 180. The energy conductor 180 may include an entry portion or region 184 that is positioned substantially adjacent to the LED 150 and an external or outlet portion that is the indicator 80. Accordingly, light may be transmitted through the light pipe 180 from the LED 150 to the indicator 80. Transmission of the light may be a selected transmission of light and may operate or be used as discussed further herein.

Accordingly, the electronics component assembly 120 may include the LED 150. Light emitted from the LED 150 through the emission portion 170 may be transported to the indicator 80 through the light pipe 180. The light transmitted through the indicator 80, therefore, may be provided as an indication to the user of a selected feature or status of the container assembly 20. In various embodiments, for example, a filled volume, life of a filter, or other appropriate statuses may be indicated.

The light pipe 180 may be formed of an appropriate material for transmitting light to the indicator 80 from the inlet 184. In various embodiments, the light pipe 180 may include a high density polycarbonate and/or acrylics (e.g. Polymethylmethacrylate (PMMA)) with a selected clarity to allow transmission. Other appropriate materials may include appropriate amorphous materials, crystalline materials, polymers, and the like such as Styrenemethylmethacrylate (SMMA), General-Purpose Polystrene (GPPS), Tritan™ plastic, and/or Poly (methyl methacrylate) (PMMA) (e.g. acrylic). Further, the light pipe 180 may be coated with selected materials to assist in internal reflectance and transmission of light from the emission portion 170 to the indicator 80.

In various embodiments, the indicator 80 is positioned a selected distance from the terminal edge 102 of the lid assembly 28. The indicator 80 may have an external or outermost edge 80a that may be selectively positioned a distance 190 from the edge 102. The distance 190 may be selected to be minimized and may generally be in a range of about 1 millimeter to about 10 millimeters, including about 2 millimeters to about 6 millimeters. Further, the indicator 80 may also be positioned a distance from the light source at the LED 150. In various embodiments, the indicator, such as the front wall 80a, may be positioned about 25 millimeters to about 40 millimeters from the LED 150. The distance 194 may also be about 29 millimeters to about 33 millimeters. Further, the light source 150 may be positioned a distance 198 from the bottom surface or exit surface of the indicator 80. The distance 198 may be about 1 millimeters (mm) to about 150 mm, including about 20 mm to about 70 mm. In various embodiments, the distance 198 may be no more than about 50 mm to ensure selected brightness. Accordingly, the LED 150 may be spaced a distance from the indicator 80 but may be provided with the light pipe 180 at the selected dimensions to achieve an appropriate indicator for the user.

In various embodiments, the light emitted at the indicator 80 may include a selected movement to be viewed or viewable by the user. For example, the light may appear to traverse a distance from one end to another of a length of a member. The light emitted may have a selected brightness. The light emitted may also be in different colors. The different colors may also include different or varying brightness. In various embodiments, the light emitted may have a luminous intensity of about 10 millicandelas (mcd) to about 20,000 (mcd), including about 10 mcd to about 1,000 mcd. It is understood that the viewable brightness at the indicator 80 may be less or more than the brightness at the LCD 150 given the light pipe 180 and the distances from the LED 150 to the indicator 80. In various embodiments, the light emitted may be in at least two colors (i.e. wavelengths) such as a RED color having a brightness range of about 800 mcd to about 3,000 mcd at about 20 milliamps (mA), with typical brightness of about 2000 mcd and/or a GREEN color having a brightness range of about 3,000 mcd to about 10,000 mcd at about 20 mA, with typical brightness of 5000 mcd while providing an indication to the user. The color (i.e. wavelength of emitted light) may change and/or be selected for viewing by the user and/or user selected. Other colors may also be provided for various purposes and/or indications such as AMBER, YELLOW, PURPLE, etc. It is understood that two colors may also be emitted simultaneously at the same or different brightness's to create different colors. The indicator 80 may be provided to be viewable in a selected environment (e.g. sunlight, artificial light, etc.) for viewing by the user.

Figure 6:
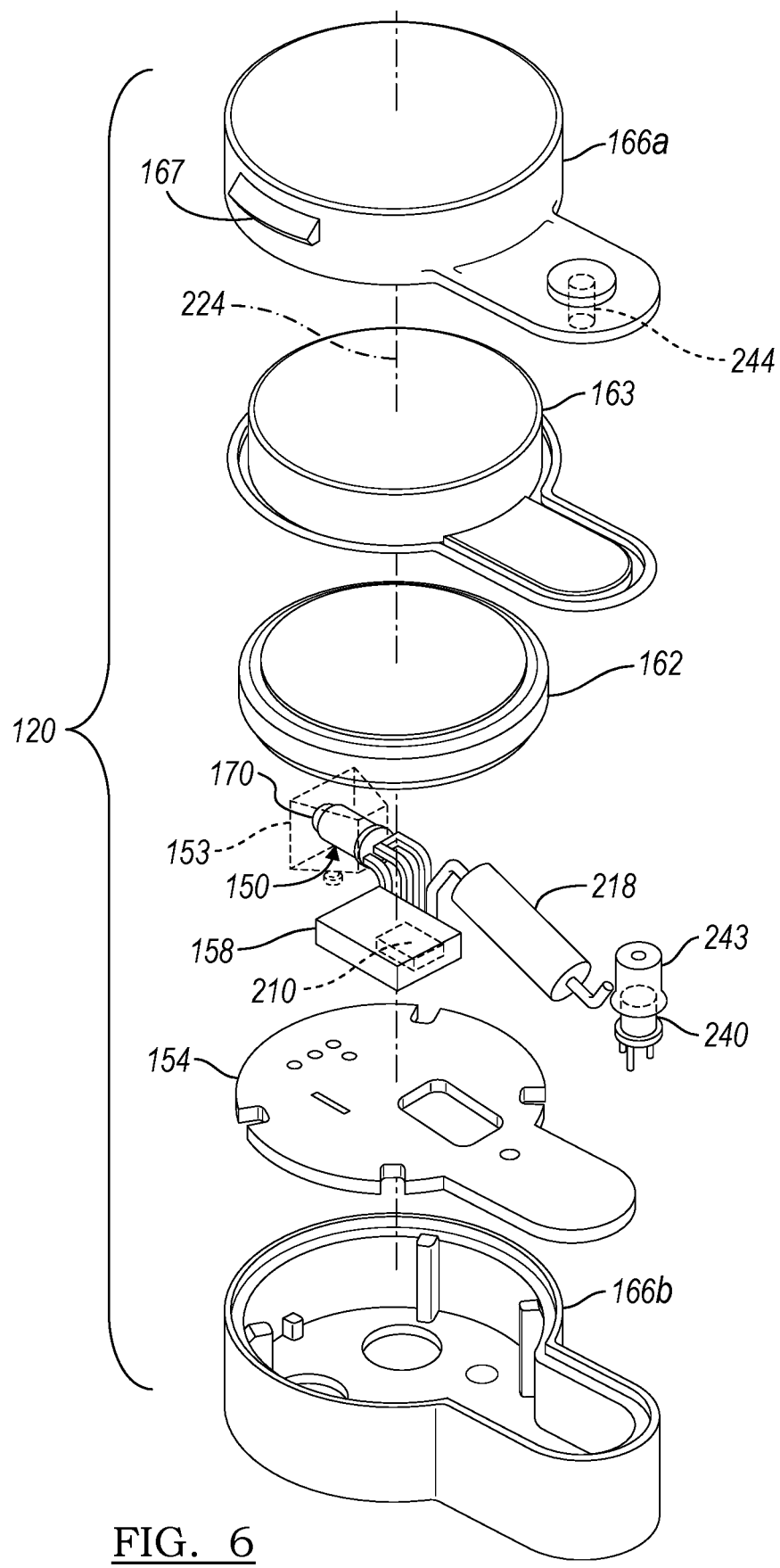
FIG. 6 is an exploded view of an electronics package assembly, according to various embodiments.
Figure 7:
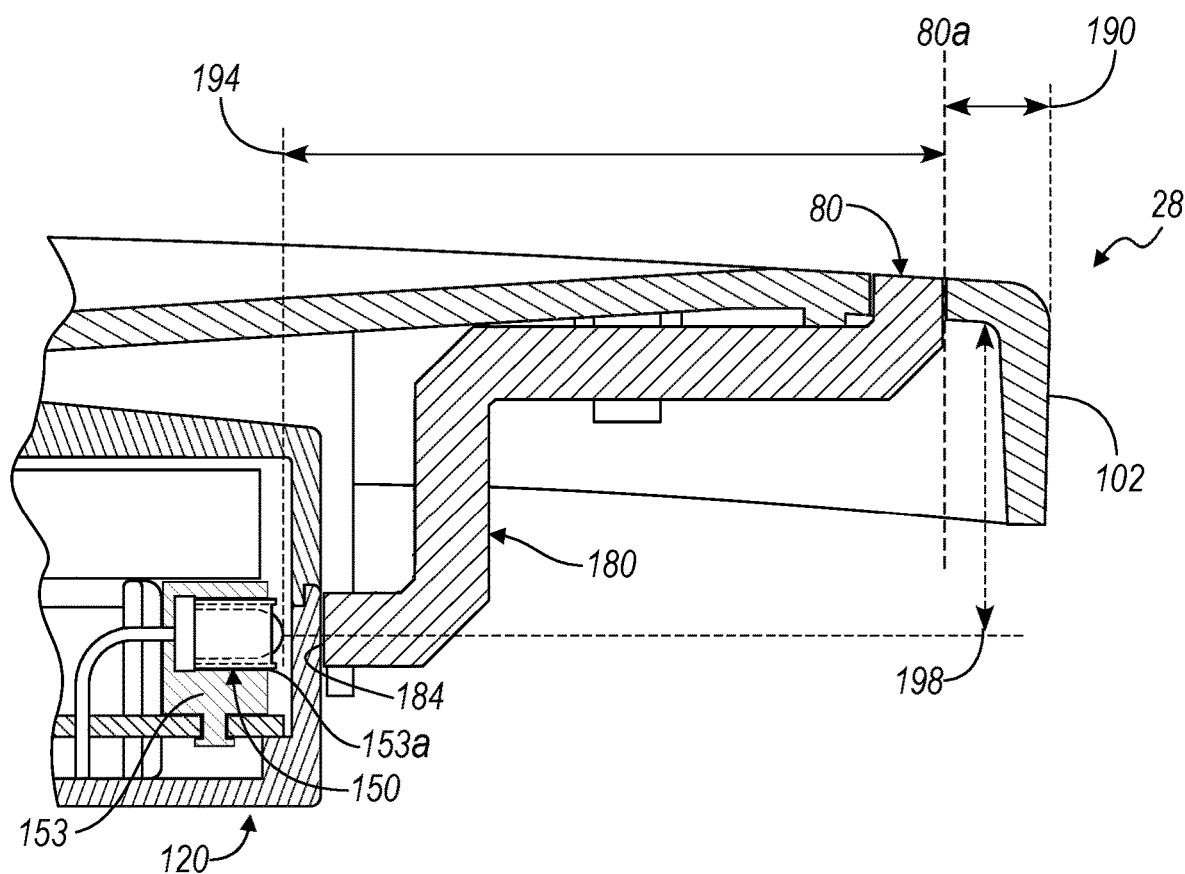
FIG. 7 is a cross-sectional view of an electronics package and lid assembly taken along lines 7-7 of FIG. 4A.

With continuing reference to FIG. 6, the electronics component 120 can include various additional sensors and/ or assemblies. As discussed above, the electronics component 120 may include the power source 162 that may power various components such as the processor module 158 and the LED 150. In various embodiments, a shroud or holder 153 (e.g. a rubber holder) may assist in stabilizing and/or holding the LED 150. The holder 153 may assist in stabilizing and holding the LED 150 relative to the board 154 and/or direct all or most of the emitted light in a selected direction, such as out a first or front side 153a (FIG. 7) of the holder 153. The processor module 158 may execute various instructions and/or calculate or store selected data points over a period of time. For example, the processor module 158 may include or be in communication with a memory system or a memory module 210.

The electronics component 120 may further include a tilt sensor 218. The tilt sensor 218 may be used to sense or indicate a tilting of the container assembly 20 from a selected axis. As illustrated in FIG. 1 the container assembly 20 may have the base surface 36 that may rest on a selected surface 220. The container assembly 20, therefore, may extend along an axis 224 that may be or extend generally perpendicular to the surface 220. The tilt sensor 218, therefore, may sense a tilt or angle relative to the axis 224. The tilt sensor may measure a discrete angle and/or provide a signal when a selected angle relative to the perpendicular axis 224. In various embodiments, the container 24 may be tilted relative to the surface 220 such that the axis 224 is moved from a non-perpendicular position to an angle that is less than, for example, about 30 degrees to about 0 degrees.

Accordingly, the tilt sensor 218 may measure or indicate when the container assembly 20 is tilted relative to the surface 220. The signal may be sent to the processor module 158 for indication that the container assembly 24 has been tilted. A tilting of the container assembly 20 may be an indication of various actions, such as pouring or emptying a selected volume of material from the container assembly 20. In various embodiments, for example, the tilt sensor 218 may be used to indicate or provide a signal that the indicator 80 may be used, such that the LED 150 is activated to transmit light to the indicator 80.

The electronics assembly 120 may further include additional sensors, such as a light sensor 240. The light sensor 240 may be positioned near a lens or transparent portion or transparent optical portion 244 that extends through the casing 166 of the electronics component package 120. The light sensor 240 may be sealed and/or stabilized and held by a seal or holding portion 243. The holding portion 243 may assist in sealing from an external environment (e.g. air and/or liquid) the light sensor 240. Further, the holding portion 243 may further assist in holding and/or stabilizing the light sensor 240 relative to the board 154 and/or other portions, such as the housing 166a, 166b and/or the transparent optical portion 244.

The transparent optical portion 244 may be formed of selected materials, such as transparent silicone. Further, the transparent optical portion 244 may engage the holding portion 243. The optical or transparent component 244 may extend through the casing and have various portions to assist in transmission or focusing features. Further, the transparent portion 244 may be positioned near or adjacent to the bore 136, as discussed above. The light sensor 240 may sense light when the fill lid 70 is moved from over the bore 136. Once the lid 70 is moved to the open position, light may then reach and transmit through the bore 136 to the transparent portion 244 and to the optical sensor 240. The optical sensor 240, therefore, may sense the light and provide an indication or a signal that the lid 70 is open and/or closed depending upon whether light is sensed or not by the sensor 240. The indication of light or sensing of light may be used to determine that the fill lid 70 is open.

The light sensor 240 may send a signal, such as with the PCB 154, to the processor module 158. The processor module 158 may execute selected instructions, such as those discussed further herein, for various purposes. In various embodiments, for example, the light sensor may provide a signal that light is sensed, such as when the fill lid 70 is opened. The processor module may receive the signal and determine a count of fill lid openings and/or volume. The count or signal from the light sensor 240, therefore, may be used by the processor module 158 to assist in determining a life of a filter, or other appropriate component or feature of the container assembly.

With reference to FIG. 4B, various user inputs may be provided to the container assembly 20. For example, as discussed above, the filter 66 may be positioned within the receiving area 64. In various embodiments, an indicator is provided or an input is provided to reset a filter count. A parameter of the filter 66 (e.g. selected remaining life) may be indicated by the indicator 80. The filter 66 may be provided in various sizes, such as a filter size of type 1 and a filter size of type 2. An input module 260 may be provided on the fill lid 70. As illustrated in FIG. 2, the fill lid 70 may be moved to allow for ease of access to an underside 264 of the fill lid 70. The underside of the fill lid 264 may have the module 260 associated therewith, such as molded integrally with the lid 70.

A set of various inputs, such as one or more switches 268, 272 may be provided with the input 260. The switches 268, 272 may communicate with the electronics module 120, such as with the processing module 158 there in. The communication may be via a selected type of communication, such as a wired and/or wireless communication. The switches 268, 272 may be covered or provided in an appropriate manner, such as under a selected covering or film, such as a Mylar® film covering or button 276, 278, respectively. The buttons 276, 278 may deflect or move upon pressure of a user to activate or send a signal with the respective buttons 268, 272. Various markings may be provided such as visual indications of the purpose of the respective buttons, such as F1 280 referring to or indicating a first type of filter and F2 284 for a second type of filter. In various embodiments, the types of filters may include sizes, filtering capacities, filtering specifications, or the like. Further, a visual indicator, such as an LED 290 may be provided to indicate when the appropriate signal has been sent with the respective switch 268, 272.

In various embodiments, the electronics module 120 may be inclusive of the input portions discussed above on the input 260. Thus, as illustrated in FIG. 4B, the same reference numerals are used augmented with a prime (') to refer to the same portions as discussed above. Therefore, a separate input module may not and/or is not included. Further, various selected indicators, such as LED indicators 123, 125 may also be included. These may also be included on the input 260. The indicators 123, 125 may provide further, alternative, or different indications to the user.

In various embodiments, therefore, the input module 260 (which may be position at any appropriate position) and/or inputs on the electronics component 120 may allow the user to input a reset command to the processor module 158. The reset command may be sent when the filter 66 is replaced in the container assembly 20. Thus, the method 300 allows the user to remove a previously installed filter and replace it with a new filter and press the respective buttons 276, 278 to activate the respective switches 268, 272 for a selected period of time to allow a signal to be transmitted and received in the method 300, or selected method, as discussed further herein according to various embodiments. After an appropriate signal has been transmitted, the reset indicator 290 may be illuminated to provide feedback to the user that the reset signal has been sent. It is understood that other appropriate feedbacks may also be provided to the user such as haptic feedbacks, auditory feedbacks, or other appropriate feedbacks. Nevertheless, the input module 260 allows the user to input to the container system 20 that the filter assembly has been replaced and that a selected process should be reset.

Figure 8:
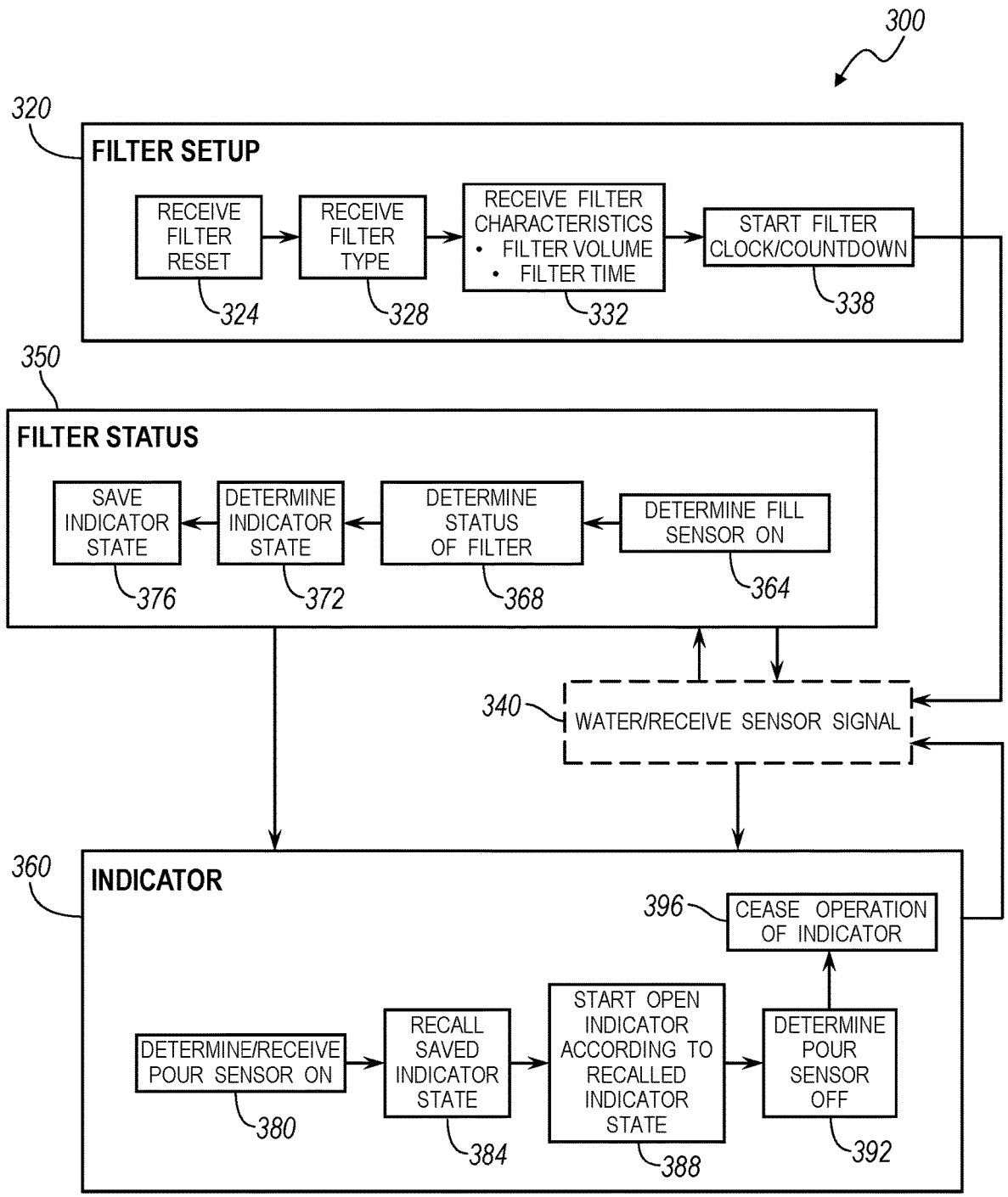
FIG. 8 is a flow chart of operation of an electronics assembly of a container assembly, according to various embodiments.

With continuing reference to FIGS. 1-7, and additional reference to FIG. 8, the electronics assembly 120 including the various components, such as those discussed above, may be used for operation or feedback to a user of the container assembly 20. As illustrated in FIG. 8, the method or process 300 illustrates a selected use of the container assembly 20, including feedback to a user.

The method or process 300 may include, as illustrated in a general diagram or block diagram, various instructions that may be executed by the processor 158 based upon input from the user and/or signals from one or more of the sensors. For example, the process 300 may include a filter setup or start up sub-process 320. The filter setup process 320 may include receiving a filter reset signal or input from a user in block 324 such as with the input system 260. The received filter reset may include a signal sent by one or more of the switches 268, 272 based upon an input or activation by a user. The filter input may include the specific type of filter, as discussed above, during the receiving the reset signal for a filter and/or providing a separate signal or switch for identifying a filter in block 328. Accordingly, the filter setup or start up may include receiving an indication of a resetting or installation of a new filter and a specific filter type.

After receiving a reset signal in block 324 and a filter type signal in block 328, the processor module 158 may recall filter characteristics and/or parameters of the filter 66 in block 332. The recalling of filter characteristics may include recalling from a selected memory, such as the memory included in the electronics module 120. In addition, recalling filter characteristics may include accessing a database of selected filter characteristics such as via an internet connection, inputting specific filter characteristics such as with the input module 260, or other appropriate inputs. Various filter characteristics may include a total filter volume or total life volume to be filtered by the filter, a lifetime such as a span or period of use time, or other appropriate characteristics. A specific example is a filter type 1 may filter 40 gallons (about 150 liters) of water while a filter type 2 may filter about 120 gallons (about 450 liters) of water. The filter time may include that a filter type 1 for 60 days while a filter type 2 for 120 days. Nevertheless the characteristics may be recalled based upon the filter type input in block 328 and initiation of a time during the reset received or input in block 324.

After recalling the selected filter characteristics in block 322, a process or start of a filter clock or countdown may initiate in block 338. Starting the clock or filter countdown may include starting a timer based upon the time of the filter reset received in block 324 and the filter time determined or recalled in block 332. Accordingly, a clock, such as in the processor module, may count a selected period of time. Additionally, a countdown may include a filter volume countdown that may be determined and stored, as discussed further herein. Accordingly, the countdown may include a countdown of a volume filtered over time or a volume filtered based upon various determinations that may be saved or used for various purposes, such as indicating such use to a user.

The container assembly 20 may include the various sensors, such as those discussed above, including the tilt or pour sensor 218 and/or the fill or light sensor 240. The processor module 158 may generally be placed in a sleep or low power mode when not in use to assist in storing or saving power from the power source 162. Accordingly, the processor module 158 may wake upon receiving the signal from one or more of the sensors in block 340. The processor module 158 may perform various tasks based upon the selected or sensed signal. A specific order discussed herein is merely exemplary.

After waking, such as based on a sensor input, a filter status determination sub-process 350 may be followed. Alternatively, and/or additionally, an indicator sub-process 360 may be followed. It is understood, however, that the sub-routines 350, 360 followed may be based upon the sensor activated or sending a signal and/or may be performed simultaneously with the processor module 158.

For example, the filter status sub-routine 350 may be followed. Accordingly, a determination of the fill sensor is on may be made in block 364. A determination of the fill sensor being on may be based upon sensing light at the light sensor 240. The processor module 158 may include various instructions that are executed, such as determining an "on" or sensing light for a selected or minimum period of time. For example, the fill lid 70 may be opened accidently and/or opened only for a brief period of time while a fill process does not occur. Accordingly, the processor module 158 may determine that a fill process happens only after the light sensor 240, according to various embodiments a fill sensor, determines a fill or activated status for greater than a selected period of time, such as about 5 seconds to about 10 seconds, and further including about 8 seconds. Accordingly, a determination of a fill sensor on may be based upon determining that the fill sensor 240 has determined a fill or open status for at least 8 seconds.

Thereafter, a determination of a status of the filter may be made in block 360. A determination of a status of the filter in block 368 may be based upon the number of times the fill sensor has determined to be on as compared to the recalled filter characteristic in block 332. For example, if the fill sensor is on it may be determined that 0.5 liters of liquid was placed in the container assembly 20. If a filter volume recalled in block 322 is 30 liters, then a determination of a status of the filter in block 360 may be a total number of times that the fill sensor has been determined to be on sense the last reset in block 324 as compared to the total number of fills to reach a selected filter amount, such as 50 percent lifespan, 70 percent lifespan, or 95 percent lifespan, or any other appropriate percent. Nevertheless, a determination of a status of the filter may be made in block 358 based upon a determination of a selected life or time of the filter that may be based upon the number of fill sensor on determinations made in block 364 since the last reset.

After determining a status of the filter in block 368 a determination of an indicator state may be made in block 372. Determination of an indicator state may be based upon the status of the filter determined in block 368. For example, if a determination of a filter status is that less than 50 percent of the life or filter volume of the filter has been used, an indicator status may emit green light, pulse at a slow rate, and/or other appropriate status may be determined. Further, if a status of the filter is determined to be between about 50 percent total life and 75 percent total life a determination of an indicator state in block 372 may emit yellow light, pulse at a selected rate, and/or etc. As a further example, if a determination of a status of the filter in block 368 is that 75 percent or more of the filter life or volume has been used, a determine indicator state in block 372 may emit red light, pulse at a fast rate, and/or other appropriate indicator state. Generally, different states will have different indications to provide selected feedback to the user.

Thus, an indicator state, such as a state of the indicator 80, may be determined in block 372. The indicator state may be based upon a selected characteristic of the filter at a set time, such as when the fill sensor is determined to be on. The state of the indicator determined in block 372 may then be stored in block 376.

Saving the state in block 376 may include saving the determined indicator state from block 372. The determined indicator state in block 372 may be determined each time that the fill sensor is determined to be on. Accordingly, the saved indicator state in block 376 may be the last saved indicator state. It is further understood, however, that a series of indicator states may be saved, such as for diagnosis, fault codes, or other appropriate purposes.

Again, it is understood that the filter status for the indicator sub-routines may be followed in any appropriate order, and the discussion after a filter status is merely exemplary. Nevertheless, the indicator sub-process 360 may include determining or receiving a pour sensor on signal in block 380. The determination of a pour sensor on may include a sense that the pour sensor 218 is activated. In various embodiments, the pour sensor 218 may be a tilt sensor. Accordingly, the pour sensor 218 may send a signal or be on when the container assembly is tilted a selected amount which may relate to a pouring of a selected volume of liquid or fluid from the container assembly 20.

After determining that the pour sensor is on in block 380, a recall of the saved indicator state may be made in block 384. As discussed above, the indicator state may be saved in block 376. Thus, when the pour sensor is on a recall of the indicator state may be made in block 384.

After recalling the saved indicator state in block 384, the container assembly 20, including the processor module 158 executing selected instructions, may start operation of the indicator according to the recalled indicator state in block 388. As discussed above, the indicator state may include any selected indicator state, such as emission of a selected color light, a selected pulse rate, or other appropriate actions. Accordingly, for example, based upon the saved indicator state that is recalled in block 384, the indicator 80 may glow or be illuminated to emit a green light. The LED 150 may emit the green light that is transmitted by the light pipe 180 to the indicator 80. Thus, the processor module 158 may operate or turn on the LED 150 and select the appropriate color or wave length emission for operating the indicator 80. The indicator is, therefore, operated according to the saved and recalled indicator state.

The indicator may be operated for a selected period of time, such as until a determination or receiving of a pour sensor off signal in block 392 and then ceasing operation of the indicator in block 396. The determination of a sensor off signal may include a sensing with the pour sensor 218 of returning to a substantially vertical state, such as having or forming the axis 224 substantially perpendicular to the surface, as discussed above. The ceasing of operation of the indicator in block 396 may include stopping illumination with the LED 150, or other appropriate indicator processes, such as those discussed above.

Accordingly, the container assembly 20 may operate the indicator 80 based upon selected characteristics, such as a status of the filter. The operation of the indicator may be based upon selected sensor input that operate to wake the processor module 158 to operate the indicator. Accordingly, after ceasing operation of the indicator and/or saving the indicator state in respective blocks 396, 376, the process 300 may loop to be waked based upon receiving a sensor signal in block 340. The container assembly 20 may operate according to the method 300 in a substantially loop manner for a selected period of time.

As discussed above, the indicator 80 may provide an indication to the user, such as via an illumination or an emission of light, for various purposes. In various embodiments, the indicator may indicate a remaining selected life of the filter 66. The remaining life may be based upon a portion or percentage of a total volume filterable by the filter 66 and/or a time of use of the filter remaining based upon a selected lifespan of the filter 66. For example, the indicator 80 may change indication colors based upon a percentage remaining of a volume of a useful life of a filter 66. For example, the indicator 80 may illuminate or glow in a green color when a useful life of the filter is greater than 50 percent. The indicator 80 may glow a yellow color when a useful life of the filter 66 is between about 25 percent and about 50 percent. The indicator 88 may glow a red color when a useful life of the filter is less than about 25 percent. It is understood that the indicator 80 may also pulse or increase and decrease in illumination at a selected rate and/or at different useful life percentages of the filter 66.

The container assembly 20, according to various embodiments, may include alternative and/or additional components and/or assembly portions as discussed further herein. In addition, the container assembly 20 may include components positioned in alternative and/or additional positions for various purposes, as also discussed further herein. Various combinations may be provided including those discussed above and further herein.

Returning reference to FIG. 1, for example, the indicator 80 may be positioned at alternative locations relative to the fill lid 70. In various embodiments, for example, the indicator 80 may be positioned closer to the fill lid 70 in the lid 28. Further, the indicator 80 may be positioned to extend through and illuminate through the front wall 102. For example, the indicator 80 may be positioned as indicator 80a shown in phantom in FIG. 1. The indicator 80a may be positioned alternatively and/or additionally to the indicator 80 in the lid member 94. In various embodiments, light illuminated through the indicator 80a may illuminate a water stream or appropriate a liquid stream 74a being passed through the spout 44 generally in the direction of arrow 74. In this instance, the liquid stream 74a may act as a lens and direct and/or be illuminated by the light from the emitter 80a. Accordingly, the indicator 80a may be provided to assist in illuminating a portion of the water stream such that the water stream may act as a light pipe. Thus, the indicator 80a may also provide an indication to the user at a position substantially through the end wall 102.

Figure 9:
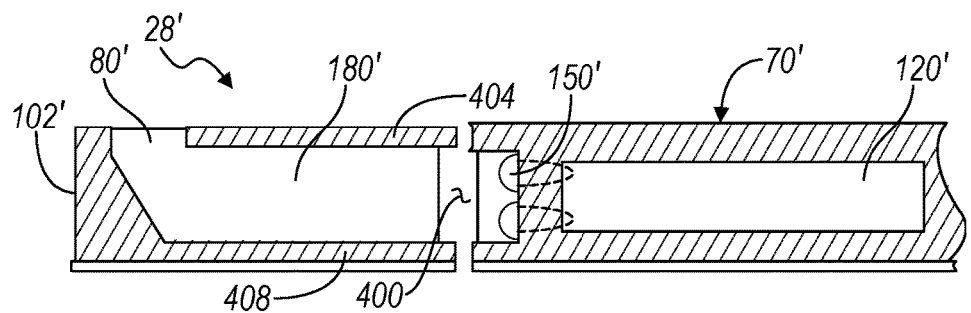
FIG. 9 is a detail cross-sectional view of a lid assembly, according to various embodiments.

Turning reference to FIG. 9, the container assembly 20 may include a lid assembly 28' having various components similar to those discussed above, but augmented with a prime. The lid assembly 28' may, therefore, include a fill lid 70'. The fill lid 70' may include an electronics assembly 120' similar to the electronics assembly 120 discussed above. Nevertheless, the electronics assembly may be positioned in or on the fill lid 70' that is movable relative to the remaining portion of the lid assembly 28', including the lid portion 94' and the container assembly 20, such as the container 24. The electronics assembly 120' may be positioned in the fill lid 70' for various purposes, such as ease of access by a user, mass distribution of the container assembly 20, and other appropriate purposes. The electronics assembly 120' may include an LED 150', including more than one LED 150' similar to the LED 150 above.

The LED 150' may be positioned near or adjacent a light pipe 180' similar to the light pipe 180 discussed above and may end or terminate in an indicator area or region 80' near the end wall 102' of the lid assembly 28'. Accordingly, the light pipe 180 may extend from near or adjacent the lid 70' to the indicator 80'. Thus, the electronics assembly 120, such as in the electronics assembly 120' may be positioned at appropriate locations in the lid assembly 28 and/or other portions of the container assembly 20. The indicator 80' may still provide indication even through the light is transmitted from at or near the fill lid 70'.

In various embodiments, for example, as illustrated in FIG. 9, the light emitted by the LED 150' may need to pass through or "jump" an air gap 400. The air gap 400 may be between the fill lid 70' and the light pipe 180' that is formed in or connected to the lid 28'. Thus, the light pipe 180' may be positioned in an appropriate location and/or the LED's 150'. Further, as illustrated in FIG. 9, the light pipe 180', according to various embodiments, may be encapsulated within a portion of the lid assembly 28'. For example, the lid assembly 28' may include an upper wall or section 404 and a lower wall or section 408. The light pipe 180' may be positioned within the wall sections 404, 408. Thus, the wall portions 404, 408 may assist in ensuring transmission of the light through the light pipe 180'.

The indicator 80' may be provided as an emission area or solid area for light emitted by the LED's 150'. A light pipe 180', however, need not be required or provided within the lid 28'. In various embodiments, for example, the wall portions 404, 408 may provide a light channel for transmitting light from the LED's 150' to the indicator area or region 80'. Further, the wall portions 404, 408 may include selective coating or materials to assist in providing internal reflectance and transmission of light from the LED's 150' to the indicator 80'. Accordingly, a light pipe or light transmission medium is not required in selected configurations or embodiments, as discussed herein. The indicator 80, therefore, may include a light path or position that may be directed by a light pipe or other portion or without such a director or transmission portion.

Figure 10A:
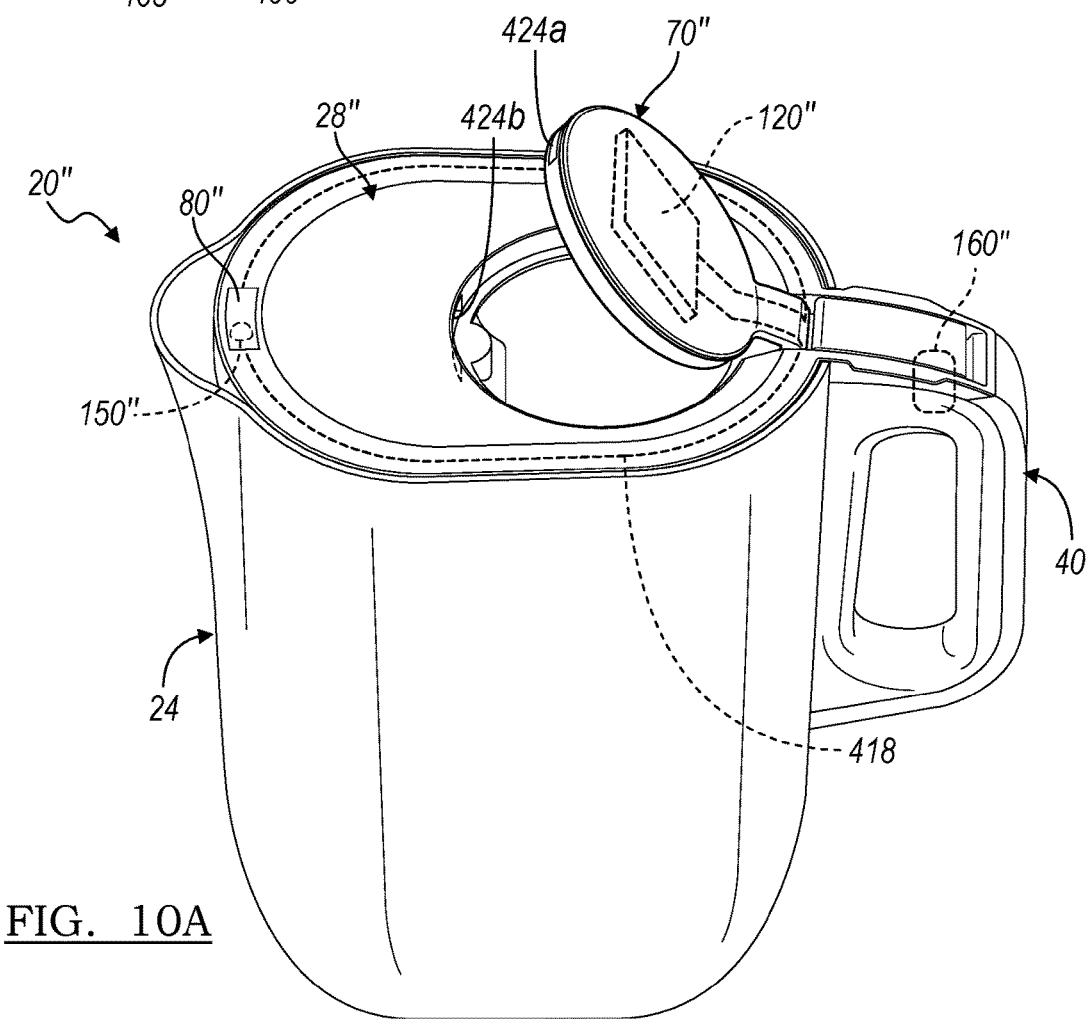
FIG. 10A is a top perspective view of a container assembly, according to various embodiments.
Figure 10B:
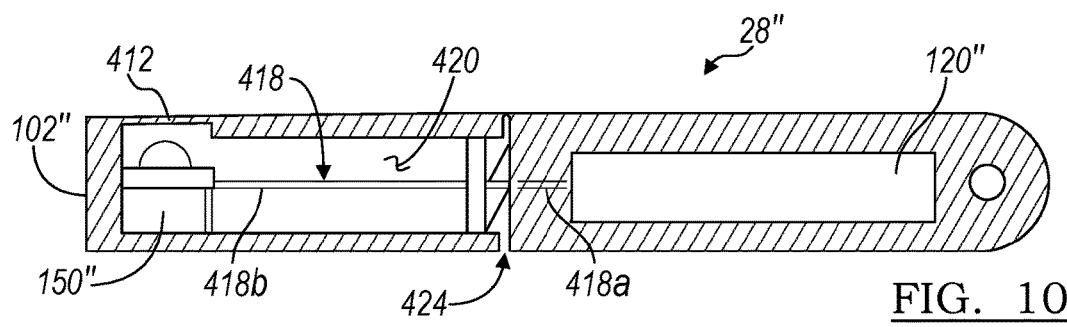
FIG. 10B is a detail cross-sectional view of a lid assembly, according to various embodiments.

Turning reference to FIGS. 10A and 10B, a container assembly 20″ is illustrated. The container assembly 20″ may include portions similar to the container assembly 20, as discussed above, and the same reference numerals will be used augmented with two primes. The container assembly 20' may include a lid assembly 28″ that includes a fill lid 70″. The fill lid 70″ may include the electronics assembly 120' similar to that discussed above. The lid assembly 70″, therefore, may include the electronics component 120' that may assist in controlling an indicator 80″. The indicator 80″, however, may include an LED or other light emission portion 150″ positioned substantially at the indicator area or region 80″, such as near the end wall 102″ of the lid assembly 28'. The LED 150″ may be positioned to be substantially exposed and/or covered by a transparent portion 412 of the lid assembly 28'.

The electronics assembly 120' may include a power source and/or controllers for the LED 150″ and may include a selected transmission portion, such as one or more lead wires 416 that may be positioned in the lid assembly 28' to extend from the electronics assembly 120' to the LED's 150″.

In various embodiments, therefore, the indicator 80″ may not need to be provided with a light pipe, such as the light pipe 180 discussed above. The indicator 80″ may include a direction emission of light from the LED's 150″. Again, the LED's 150″ may emit light directly and/or be covered by a transparent portion or wall, such as the wall 412. Further, the lid assembly may include substantially sealed or enclosed portions, therefore, such as a region or volume 420 that may capture or hold the LED 150″ in selected portions, such as a portion of the lead 418.

In various embodiments, the lead may include a direct or provide continuous connections from the electronics assembly 120' to the LED's 150″. For example, as illustrated in FIG. 10A, the leads 416 may extend through the fill lid assembly 70' and through the container lid portion 28″ to the LED 150″. In various embodiments, however, the leads 418 may include a first lead portion 418a that extends from the electronics assembly 120' and a second lead portion 418b that extends from the LED 150″. The two lead portions 418a, 418b may form a lead such as through electrical contacts or connections 424. The contact 424 may include a first contact portion 424a on the fill lid portion and a second contact portion 424b on the lid portion in the opening covered by the fill lid 70″. The contacts 424 may make electrical contact when the fill lid 70″ is closed to make the connection between the electronics assembly 120' and the LED's 150″.

Accordingly, as illustrated in FIGS. 10A and 10B, the electronics assembly, including the power source and other portions and the LED's or light emission portions 150″ need not be on a single unit or rigidly connected to one another. Rather, various components, such as the LED's 150″ may be positioned away from the other portions of the electronics assembly 120'. Further, various other portions, may also be separated such as positioning the power source away from the electronics assembly 120'. For example, the power source may be included in the pour handle 40 or other appropriate positions.

The power source 162 may be positioned away from the electronics assembly 120, 120' for various purposes, such as ease of replacement of the power source (e.g. replacing the battery) or other appropriate portions. Accordingly, a power source 160' may be positioned away from the electronics assembly 120' by being in electrical connection with the electronics assembly 120', such as through leads or other appropriate connections. The power source 160', therefore, may be easily accessed by removing the lid assembly 28″ for replacing the battery or power source 160'.

Figure 11B:
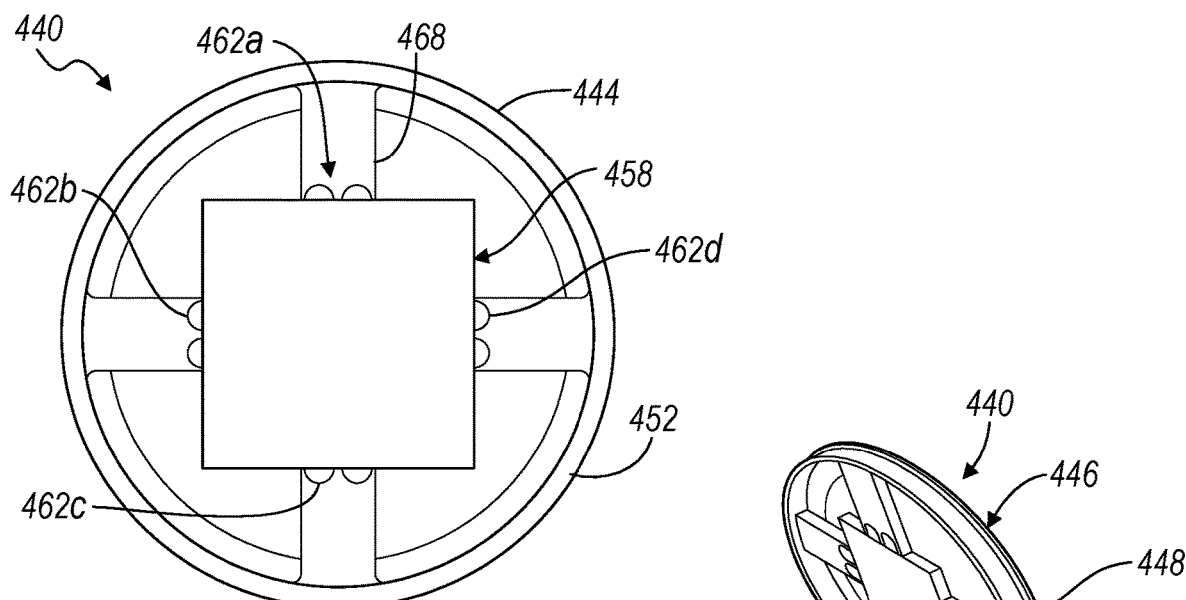
FIG. 11B is a bottom plan view of a fill lid assembly, according to various embodiments.
Figure 11A:
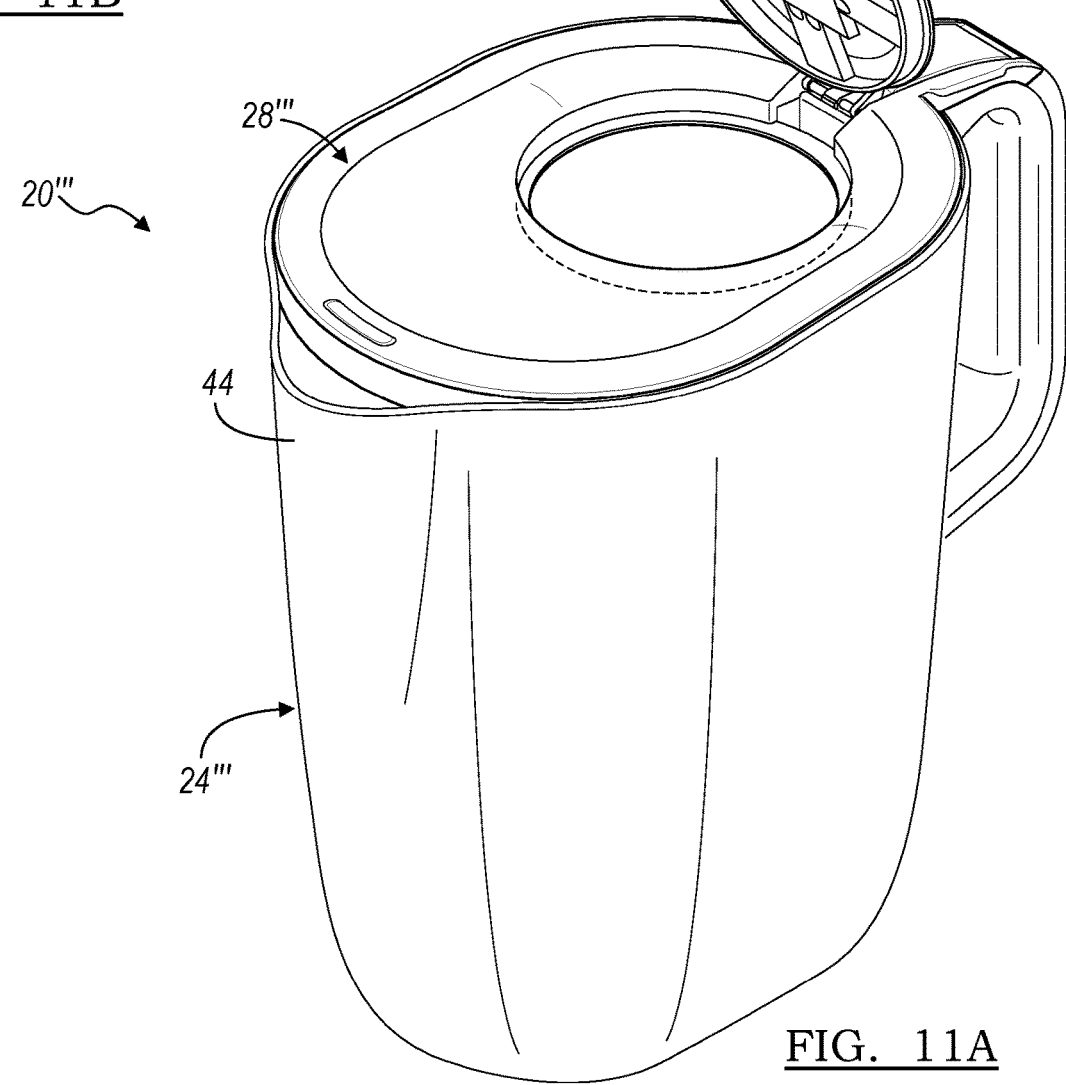
FIG. 11A is a top perspective view of a container assembly, with a fill lid open, according to various embodiments.

Turning reference to FIG. 11A and FIG. 11B, a container assembly 20‴ is illustrated. The container assembly 20‴ may include portions similar to those discussed above and have similar reference numerals augmented with three primes. The container assembly 20‴ can include the container 24‴ and the lid assembly 28‴. The lid assembly 28‴ may include a fill lid 440 that may be similar to the fill lid 70, as discussed above. The fill lid 440, however, may include selective transparent and/or light pipe portions, such as an external ring or edge 444 that may be formed as a light pipe material that may allow an upper or outer surface 446, a sidewall 448 and a bottom wall 452 to be substantially transparent and/or transmit light.

Further, the lid assembly 440 may include all or a portion of an electronics assembly 458 which may include at least one or more LED assemblies 462 including a first LED assembly 462a, a second LED assembly 462b, a third LED assembly 462c, and a fourth LED assembly 462d. It is understood that any appropriate number of LED assemblies may be provided and four is merely for illustration. Nevertheless, the LED's 462 may also be interconnected with selected light pipes, such as for example a first light emission channel or pipe 468 to the external or outer light channel 446. The light from the LED assemblies 462, therefore, may be transmitted to the external portions and be transmitted up through the outer or first surface or edge 446, the outer edge 448, and the lower edge 442.

Thus, the light assembly on the fill lid 440, including light transmission portions, may act as the indicator 80. Rather than or alternatively to the indicator 80 and having an indicator near or adjacent to the pour spout 44, the indicator may be positioned near the fill area. Further, the indicator may be larger, such as including substantially an entire area or outer circumference of the fill lid 440. It is understood, however, that the indicator may also only be a portion of the outer circumference of the fill lid 440 and/or include an indicator positioned within an outer circumference of the fill lid 440.

Figure 12:
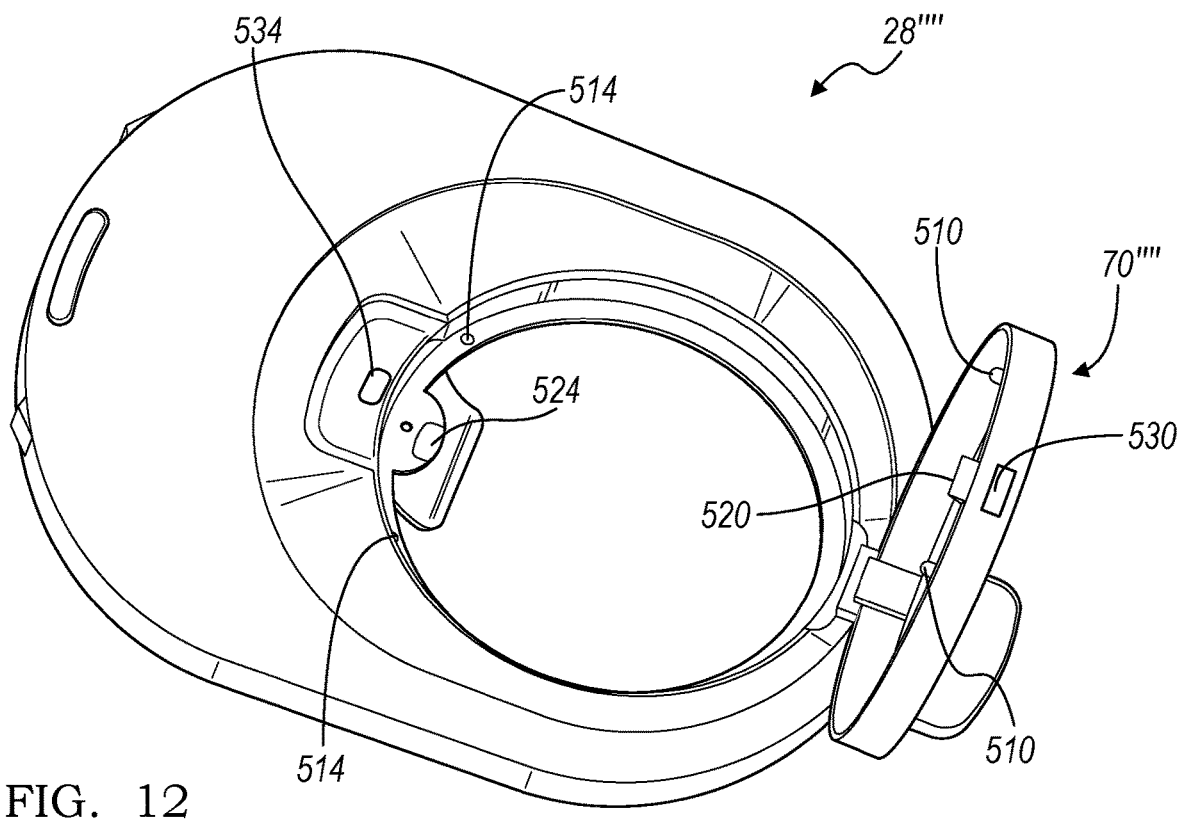
FIG. 12 is a top perspective view of a lid assembly with a fill lid open, according to various embodiments.

Turning reference to FIG. 12, the fill lid 70, as discussed above, may be opened to fill the reservoir volume 54. The opening of the reservoir volume 54, as also discussed above, may be used to determine a volume or use of the filter 66. As also discussed above, the light sensor may be used to sense light that is allowed past the fill lid 70 when the fill lid 70 is moved to an open position, as illustrated in FIG. 12. In various embodiments, however, a sensor or switch alternatively to and/or in addition to the light sensor may be used.

In various embodiments, an electrical switch may be included such as by including one or more metallic or conductive contacts 510 on the lid that may contact lid contacts 514 when the fill lid 70''' is closed. Accordingly, the electronics assembly 120 may include various switches or contacts that indicate when the lid 70'''' is closed. When open, a signal may be received that the fill lid 70'''' has been opened. The contacts 510 in combination with the contacts 514 may be used as an indication that the fill lid 70'''' is open. This may be used in addition to and/or alternatively to the light sensor as discussed above.

A further indicator or switch for determining that the fill lid 70'''' is open may be a physical switch. A physical switch may include an extension or projection 520 that extends from the fill lid 70''''. The extension 520 may engage a switch or movable portion 524 of the lid 28''''. The switch member 524 may be engaged with the projection 520 to provide an indication that the fill lid 70'''' is closed. Thus, when the switch portion 524 is disengaged due to movement of the projection 520 away from the switch portion 524, a signal may be determined and/or transmitted that the fill lid 70'''' is open. Accordingly, the physical switch, including the projection 520 and the switch portion 524, may also be provided and/or alternatively to the light sensor to provide a signal that the fill lid 70'''' is open.

Further, the fill lid 70'''' may include a magnetic member or portion 530. The magnetic portion 530 may interact with a Hall Effect sensor 534. The Hall Effect sensor 534 may sense that the magnetic member or portion 520 is near or adjacent the Hall Effect sensor 534. Thus, with the Hall Effect sensor 534 and the lid 28'''' the movement, such as away from the Hall Effect sensor 534 by the magnetic portion 530 may be used as an indication that the fill lid 70'''' is open.

Thus, the signal regarding an open lid may be determined and sent that the fill lid 70 is open according to various embodiments and portions. Including the light sensor is, therefore, not required, but may allow for an integration of a single sensor and selected portion relative to the electronics assembly 120 for providing an indication that the fill lid 70 is in a selected state, either open or closed. As discussed above, the determination of a state or position of the fill lid may be used to determine whether a volume of water is being added to the container assembly 20 and a determination of a life of the filter 66.

Figure 13:
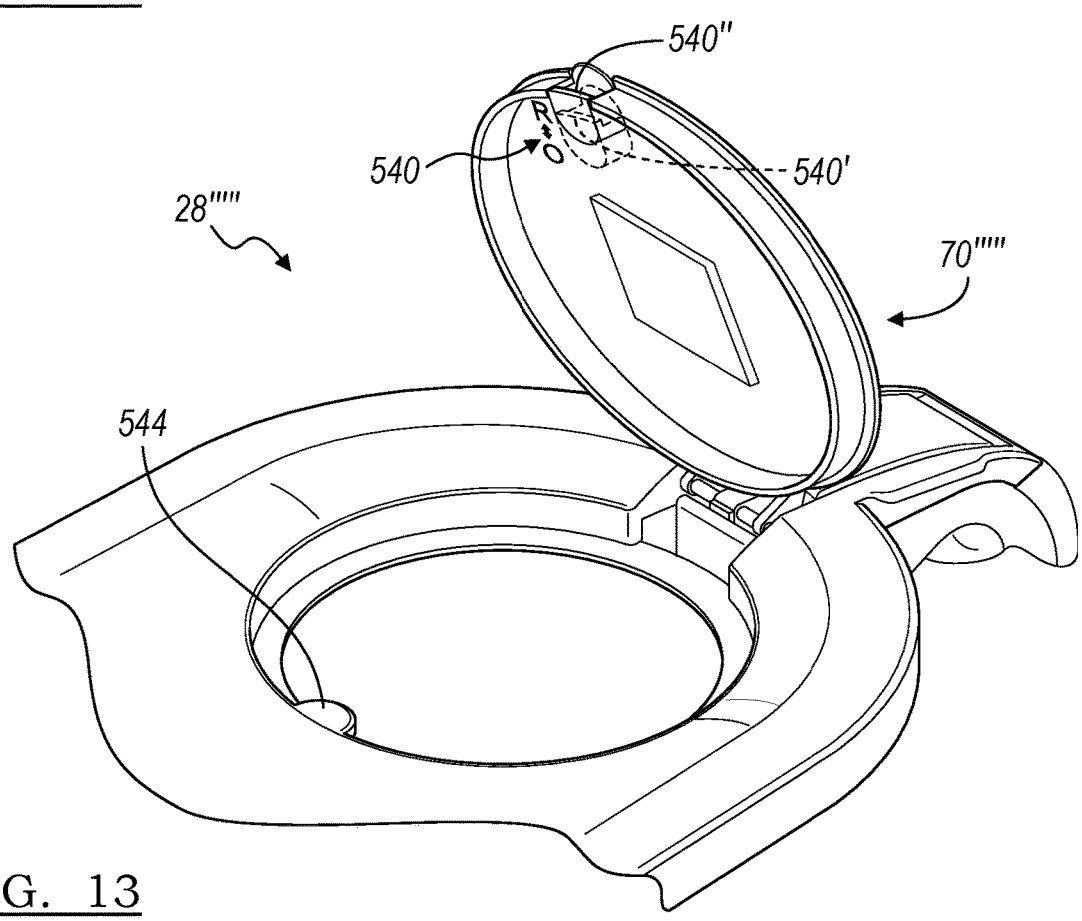
FIG. 13 is a partial top perspective view of a lid assembly with a fill lid open, according to various embodiments.

Turning reference to FIG. 13, a lid assembly 28'''' may include the fill lid 70''''. As discussed above, a switch or input may include one that allows a user to indicate a reset or renewal of the filter 66 positioned in the container assembly 20 such as with a user input. In various embodiments, however, a reset may include an alternative and/or additional switch, such as a movable or slidable switch member 540. The switch member 540 may be slid from a first or non-reset position 540' to a reset position 540''. In the reset position 540'', the switch member 540 may engage a selected switch portion, such as a Hall Effect sensor, a physical switch member, or the like 544. The electronic sensor or switch portion 544 may be engaged by the physical switch or movable member 540 when in the reset position 540''. Thus, the user may position a filter within the container assembly 20 and move the switch 540 to the reset position 540''. Upon closing the fill lid 70'''', the switch member 540 may engage the reset switch 544. This allows the electronics assembly 120 to receive a signal that the filter 66 has been replaced and the reset process may be followed. The reset process may be similar to that discussed above, regardless the position of the reset switch or command.

As discussed above, the fill lid 70, in various embodiments, may be positioned on the lid 28, according to various embodiments, to allow for filling the pre-filter volume 54. It is understood that the fill lid 70 may be positioned near or adjacent to the handle 40 and/or near or adjacent to the spout 44. Further, while the fill lid 70, according to various embodiments, is illustrated substantially cylindrical, it is understood that the fill lid 70 may be provided in other appropriate shapes such as substantially rectangular, oval, or the like. Further, the fill lid 70 may extend a substantial portion of the lid 28, such as generally from near the handle 40 to the spout 44. In various embodiments, for example, the fill lid 70 may include the indicator 80 and the electronics assembly 120 and be opened and closed such as for filling or refilling the container assembly 20.

Further, the indicator 80, as discussed above, may be included in various positions around the lid 20. In various embodiments, the indicator 80 may include a LED or light portions 560 (FIG. 1). The LED's or other appropriate light emitter portions 560 may emit light similar to the indicator 80, as discussed above. The indicators 560, however, may emit light into the container 24. In various embodiments, the container 24 may be a clear or translucent material and the indicator lights 560 may illuminate all or a portion of the container 24. Thus, the illumination from the indicator may be out or down toward the base 34 rather than only up as by the indicator 80. Accordingly, the indication, as discussed above, may be provided to the user at various positions relative to the container assembly 20.

Figure 14:
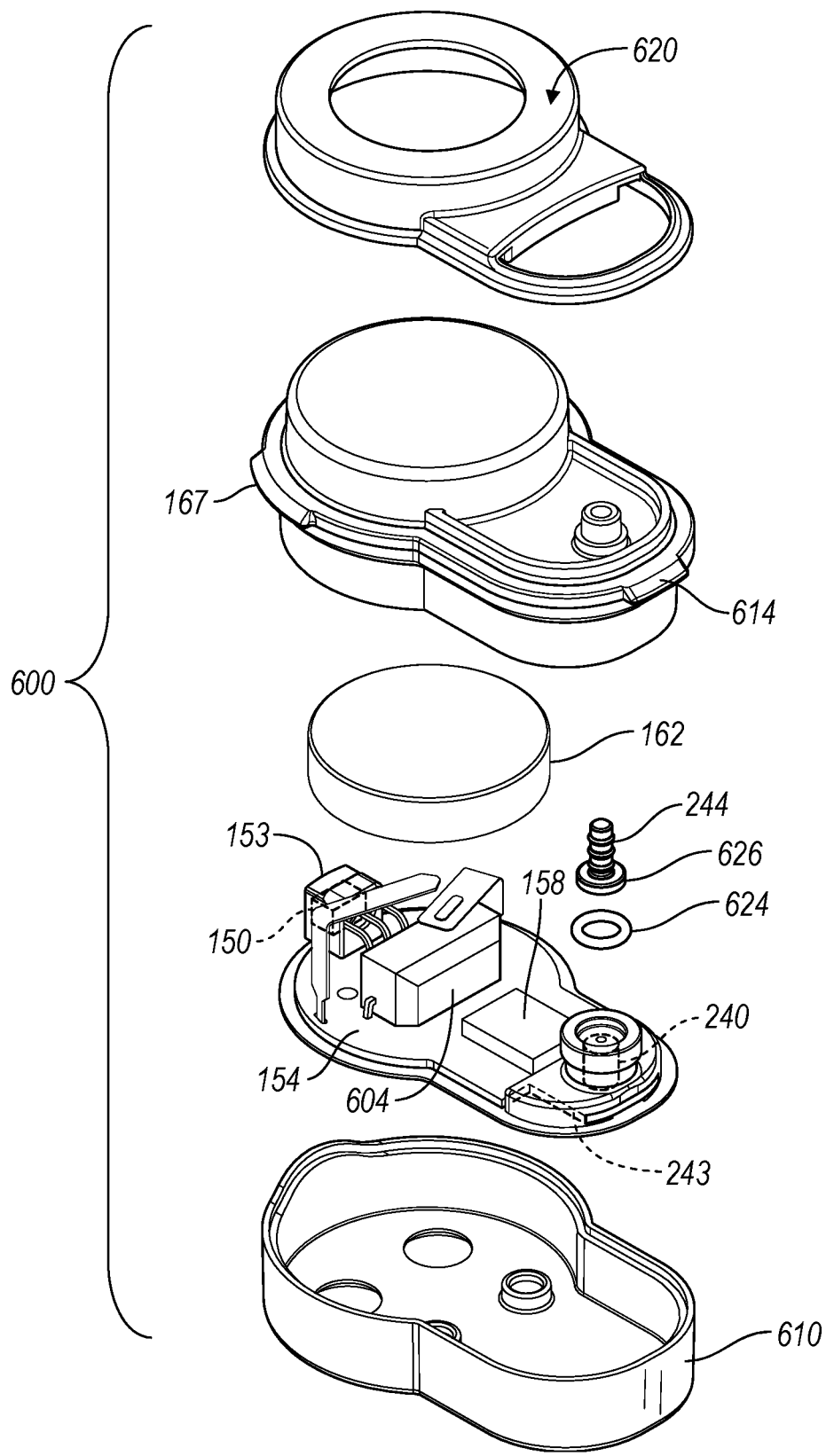
FIG. 14 is an exploded view of an electronics package assembly, according to various embodiments.

As discussed above, the electronics assembly 120 may be provided with a selected container, or a lid assembly, such as the lid assembly 20. The electronics assembly, however, may be provided with the casing assembly 166. In various embodiments, however, with reference to FIG. 14, an electronics assembly 600 is illustrated. The electronics assembly 600 may include various components similar or identical to those discussed above, such as the board or PCB board 154, the LED holder 153 (which may hold or encompass the LED 150), the processor module 158, the optical sensor 240, the optical sensor holder 243, and other selected components. It is further understood that selected portions may include or be provided with alternative configurations or systems, such as an alternative tilt switch or tilt sensor 604. Further, the transparent lens or portion 244 may also be provided to allow for light to be transmitted to see the optical sensor 240, as discussed above.

The electronics assembly 600, however, may include similar or alternative components such as a first casing member 610, which may be an outward facing or user facing casing portion and a lid facing or second casing component 614. The two casing components 610 and 614 may be held or fixed together in a selected manner, such as with a sonic welding, adhesives, or the like. As discussed above, a selected seal or gasket component may also be provided between the two casing members 610, 614.

In various embodiments, additional components and/or seal portions may also be provided. For example, a gasket assembly or member 620 may be provided and positioned relative to the casing member 614 such as to substantially seal the casing member 614 relative to the lid or portion thereof, such as the undersurface 124. The gasket 620 may seal and make substantially liquid impervious the area between the housing 614 and the underside of the lid 124. Thus, an ingress of water and/or other liquids may be substantially limited or eliminated. Possible degradation due to the ingress of water may be reduced and/or eliminated.

Additionally, selected seal components may be provided relative to other portion of the electronics assembly 600. For example, a sealing member 624 may be provided relative to the transparent portion 244. The sealing member 624 may be an O-ring that is positioned near a base 626 of the transparent portion 244. The sealing member 624 may seal the transparent portion 244 relative to the casing 614 and/or to the gasket 620. Thus, the positioning of the transparent member 244 and the sealing portion 624 may allow for the formation or inclusion of a substantially constant seal over the casing portion 614. The casing portion 614 is substantially sealed relative to the underside of the lid 124 to assist in reducing and/or eliminating the ingress of liquid, such as water.

The casing 614, as discussed above, may include one or more projections or wings 167 that may be engaged by one or more fingers 630 that may extend from the bottom surface 124 of the lid. The fingers 630 may have a finger or projecting portion 634 that engages the ear or tab 167. Therefore, the electronics assembly 600 may be held relative to the lid underside 124 with the projections 630. The gasket or sealing portion 620 may seal relative to the lid underside 124 and/or a raised wall 638 that extends from the underside of the lid underside 124. As discussed above, the sealing portion 624 may also assist in sealing the exterior, such as relative to the lid, the transparent portion 244 in addition to and/or with the gasket 620.

Figure 15:
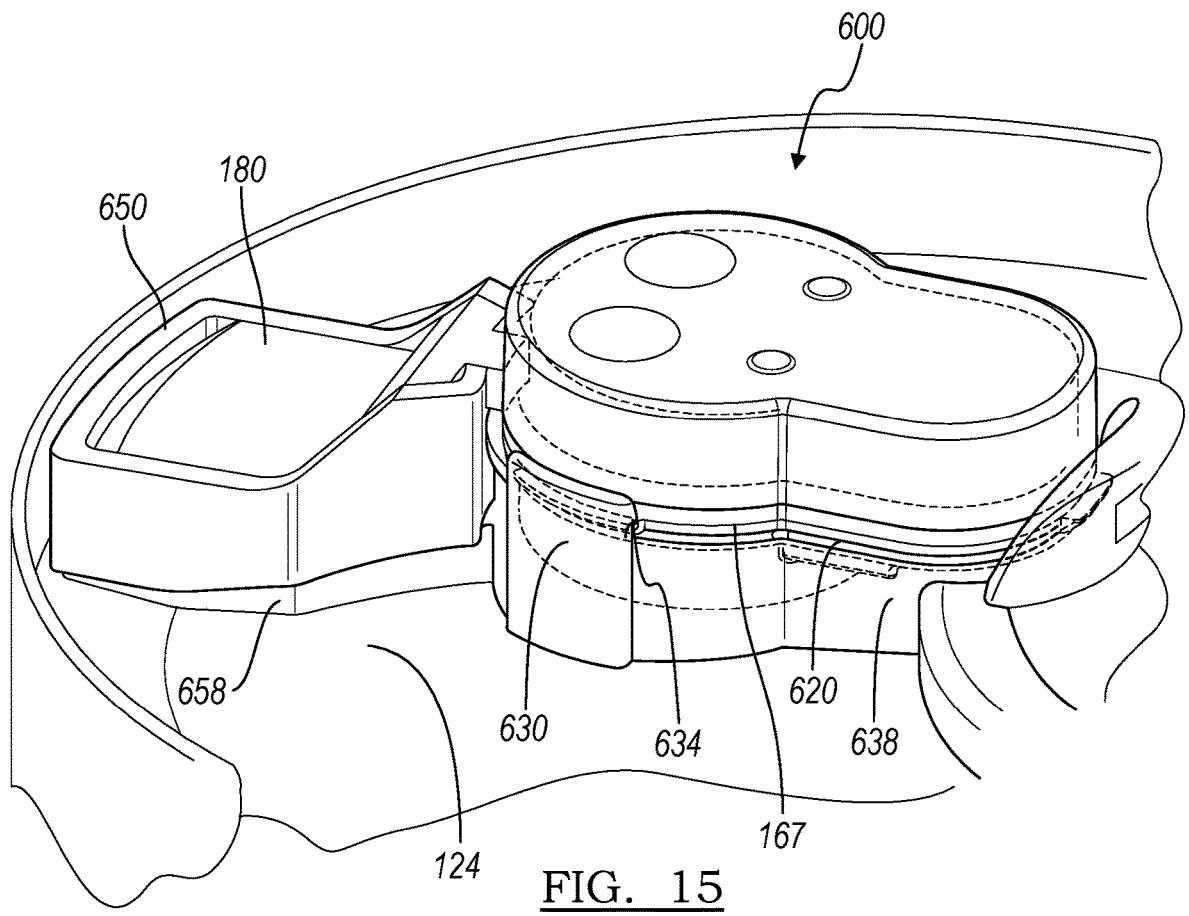
FIG. 15 is a detail view of a light pipe assembly and lid portion, according to various embodiments.
Figure 16:
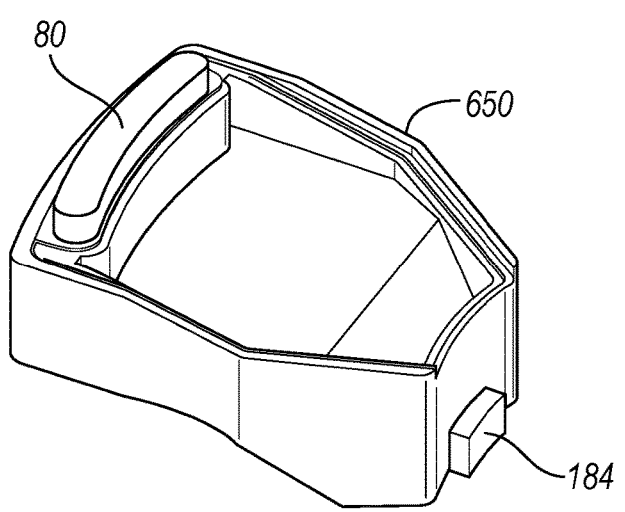
FIG. 16 is a detail view of a light pipe and shroud assembly.

With continuing reference to FIG. 15 and additional reference to FIG. 16, the light pipe or guide 180 may be held and/or encapsulated, at least partially, within a shroud or holding portion 650. The shroud 650 may assist in directing and/or ensuring a majority of light transmitted to the light pipe 180 is provided and/or through the indicator 80. The light pipe 180, as discussed above, includes the indicator portion 80 which is generally viewable by a user. The light pipe 180, further includes the inlet or entrance portion 184 that receives the light or light from the outlet portion 170 of the LED 150. The light pipe 180, therefore, may direct light to the indicator 80, as discussed above.

The shroud 650 may be substantially opaque such that light is substantially transmitted only through the light pipe 180 to the indicator 80 from the inlet 184. As illustrated in FIG. 15, the light pipe 180 may be positioned within the shroud 650. The light pipe 180 may be fixed to the shroud 650 in a selected manner, such as with ultrasonic welding, adhesives, co-molding or extrusion, or other selected connection features. In various embodiments, the shroud 650 is overmolded on the light pipe 180. The light pipe 180, however, may be held relative to the shroud 650 in a selected manner.

Further, the light pipe 180 and/or the shroud 650 may be fixed to the lid underside 124 of the lid 94. In various embodiments, a raised wall or section 658 may extend from the underside 124 of the lid 94. The raised wall or edge 658 may include a projection or welding portion to allow for ultrasonic welding to the light pipe 180 and/or the shroud 650. Accordingly, the wall 658 may be substantially sealed to the light pipe 180 and/or the shroud 650. The sealing and/or fixation of the light pipe 180 and/or the shroud 650 may assist in minimizing or eliminating liquid, such as water, ingress between the light pipe 180 and the underside of the lid 124. The raised wall 658 may extend or be co-extensive, such as molded with, the wall 638 to which the electronics component 600 is positioned or fixed. This arrangement and construction allows the area or volume between the light pipe 180 and the underside of the lid 124 may be substantially sealed to an exterior environment, including gas and/or liquid.

As discussed above, the light pipe 180 may be fixed, such as substantially sealed, to the shroud 650. Therefore, the shroud 650 may be fixed to the wall 658, such as with ultrasonic welding. In various embodiments, however, the light pipe 180 may also be directly and/or alternatively fixed directly to the wall 658. It is understood that other selected features may also be provided such as selecting sealing members, such as rubber or liquid tight gaskets may be provided between the light pipe 180 and/or the shroud 650 in the underside of the wall 124. The seal and/or connection allows a volume or area between the light pipe 180 and the underside of the lid 124 to be substantially sealed relative to an exterior environment to minimize and/or eliminate ingress of external environmental features, such as liquid and/or gas. It is understood, however, that various combinations of the above-identified lid or electronic assembly components may be combined and/or eliminated or provided together according to various embodiments. Thus, the container 20 or lid assembly 28 may provide an indication to a user, as discussed above.

Figure 17:
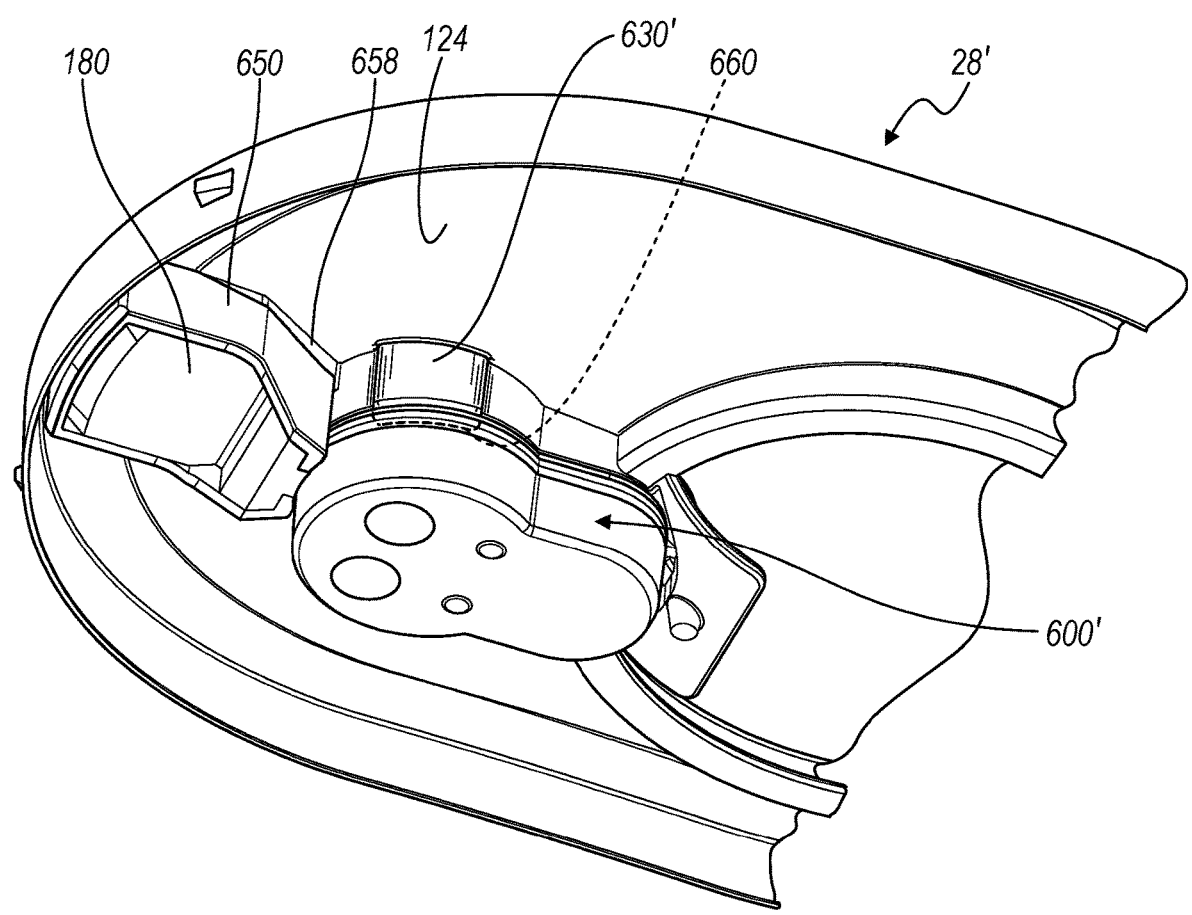
FIG. 17 is a bottom perspective view of a lid assembly with a closed fill lid, according to various embodiments.

Turning reference to FIG. 17, a lid assembly 28' is illustrated. The lid assembly 28' may be included in a container assembly 20, as discussed above, and/or may replace the lid assembly 28 or include features alterative to or to be added to the features of the lid 28. As discussed above, and illustrated in FIGS. 15 and 16, the light pipe 180 may be overmolded by the shroud 650 which is held or welded to a wall portion or welding portion 658 that may extend from the bottom surface 124 of the lid assembly 28'. An electronics assembly 600' may be similar to the electronics assembly 600, as discussed above. The electronics assembly 600', however, may be connected to the lid assembly 28 with a latch or finger portion 630' that extends under or into the electronics assembly 600'. As discussed above, the electronics assembly 600' may include a housing, such as a housing 610. The finger or extension 620' may extend into a portion or engage the housing 610 internally and not on an exterior of the housing. In various embodiments, therefore, an internal finger or engagement portion 660 may be engaged by the finger 630' to hold the electronics assembly 600' relative to the lid assembly 28'.

Accordingly, the electronics assembly may be held in the lid assembly 28, according to various embodiments, in an appropriate manner. For example, the electronics assembly may be adhered, welded (e.g. ultrasonic welding), engage in an external surface with an interference engagement (e.g. an external finger), engage on an internal surface or portion with a finger or engagement portion, or combinations thereof. Nevertheless, the electronics assembly is generally held relative to the lid assembly 28, according to various embodiments, for use of the container assembly, as discussed above and herein.

Figure 18:
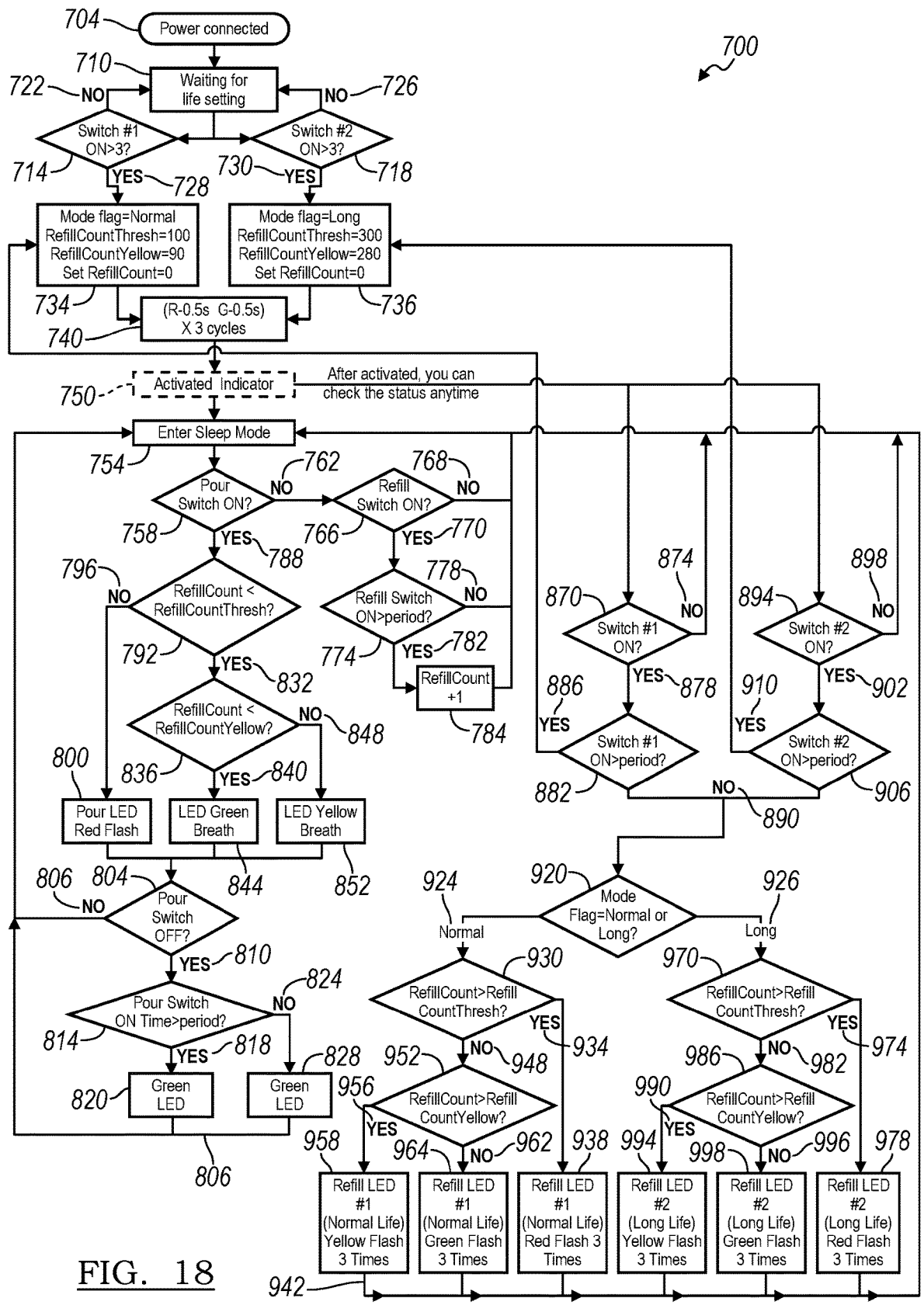
FIG. 18 is a flow chart of operation of an electronics assembly of a container assembly, according to various embodiments.

Turning reference to FIG. 18, a flowchart 700 is illustrated. The flowchart 700 may include portions that are similar or identical to the method or flowchart 300, discussed above, and/or additional or alternative portions thereto. It is understood that the flowchart 300 may be incorporated into the flowchart 700 and vice versa, to provide operation for the indicator 80 and/or the electronics assembly 600, according to various embodiments. Accordingly, the flowchart 700 is understood to illustrate an operation of the assembly, according to various embodiments, that may incorporate or be incorporated into other method portions as discussed above.

The flowchart 700 may include various actions that may occur in an assembly process, such as a factory, by a user, or instructions executed by a processor assembly. Accordingly, the flowchart 700 may be used to illustrate operation of the electronics package in particular for providing indication at the indicator 80. For example, a power connected in block 704 may be performed by a user and/or during an assembly. Connecting the power may be an action taken by an assembler and/or a user to initiate the operation of the system. It is understood, however, the connected power in block 704 may include a wake or initialization of the method 700 and need not include a physical act separate from the processor assembly executing instructions or providing indications, as discussed above. In various embodiments, the power connected in block 704 is simply an assembly act that may be made during production, and need not occur as a part of the method 700 that includes instructions executed by the processor module 150.

Nevertheless, after the initialization, such as the power connection block 704, the method may initially include waiting or a sleep more while waiting to receive a life setting that may also be a filter selection in block 710. The waiting or sleep mode may be a low power state to conserve battery life during various actions, such as supply chain delivery, etc. As discussed above, it is further understood that the electronics assembly, including the processor assembly, may be used to assist in providing an indication for the filter assembly 66 included in the container assembly 20. Accordingly, waiting for a life setting in block 710 may be after any reset or initiation of the system, rather than just simply after power is first connected.

Nevertheless, while waiting for a life setting in block 710, an input can be made from a first switch or decision block 714 or a second switch or decision block 718. As discussed above, the input 260 and/or the electronics assembly 120 or according to various embodiments, may include first and second switches 268, 272. Further, the reset 290 may provide an input for power connection in block 704, and/or resetting and selecting a filter life. It is understood, however, that the reset button 290 is not required. All of these may provide inputs or an indication or decision for the filter types which may relate to whether the first or second switch is input in block 714 or 718. Further, it is understood, that the system may include more than two switches or inputs that may allow for the input of more than two different types of filter assemblies, for the method 700. Nevertheless, for the current discussion the two switches and two types of filter inputs may be provided. Nevertheless, each of the switches in decision blocks may follow a respective NO path 722 or 726 which loops or maintains the waiting state of the system. Further, each of the switches 714, 718 may provide inputs that may follow respective YES paths 728, 730, as discussed further herein.

As discussed above, the system may include two types of filters, such as one being a first type of filter which may include a first life span or filter volume and a second type of filter which may include a second life span or filter volume, the second lifespan or filter volume may be greater than the first. In various embodiments, therefore, the YES path 728 may lead to a recall or setting of a flag count in block 734. In various embodiments, the block 734 may include a normal or first life span. The system then includes a selection or recalling of a refill count threshold 100 and a refill count yellow of 90 and a setting of a refill count to 0. In following the YES path 730 a second recall threshold in block 736 may be made. The mode flag and mode selection may be a long lasting or second life span in the second block 736. Therefore a refill count threshold of 300 may be recalled and a refill count yellow of 280 may be recalled and a refill count may be set to 0. When selecting or resetting a filter install, therefore, the initial refill count may be set to 0 (zero) and recalled refill counts may be made. The recalled refill counts may be predetermined and stored for recall by the processor module.

Therefore, the method 700 may include the selection or receiving a signal from either of the first switch or second switch in block 714 and 718 which may lead to a respective and/or alternative recalling of counts in block 734, 736. The reset or determination of a selection may be based on a selected received signal. For example, the processor module may select a reset or recall of the thresholds if one of the switches is held for a selected period, such as at least three seconds.

After the switches are selected and either simultaneous with or following the recall of the selected count thresholds in blocks 734, 736, a test run or initialization indication may be made in block 740. The test run may include powering each of the selected colors of the LEDs 150 for a selected period of time and/or for a select number of cycles. For example, a red LED may be powered for 0.5 seconds, followed by a green LED for 0.5 and this may repeat a selected number of times, such as three times. Therefore, the user may be provided an indication that the system has powered on and/or received a recognized input regarding the selected switch and/or filter. Further, it is understood that the test run in block 740 may be able to differentiate the input based upon switch 1 or switch 2 and, therefore, the test run in block 740 may include a different cycle or different lighting times of the LEDs to provide a conformation of a selected filter.

Following the initialization cycle indicator in block 740, an activation indicator or status determination may be allowed in block 750. The activation block 750 may include a determination or selection of a status of the system at any appropriate time. For example, the user may press one or more of the switches 268, 272 for a selected period of time, such as less than a reset or selection time, to have a system provide an indication or a status thereof. It is understood, however, that the activation or status indicator in block 750 is optional and need not be required in the system.

After activation at block 740, the system may enter a sleep mode or wait mode in block 754. For example, the processor assembly or module 158 may enter a sleep mode for a selected period of time and/or until a selected input is received, such as a selected switch sending a signal that is received by the processor module 158 or a selected time period has passed.

In the sleep mode, for example, the processor module 158 may receive a signal from a pour switch or determine that the pour switch is on in block 758. The pour switch may be any appropriate switch, such as the tilt switch 218, according to various embodiments, as discussed above. The pour switch may be used to determine that the pitcher assembly or container assembly 20 has been tilted a selected amount, generally a selected angle relative to gravity or other set relative position may be used. The tilt switch 218 may send or transmit an ON signal which may be the ON signal for determining if the pour switch is on. At the determination block 758, a determination that the pour switch is not ON may be made and a NO path 760 may be followed to a decision block of whether the refill switch is ON in block 766. The refill switch may be any appropriate switch, such as the light sensor 240, as discussed above, according to various embodiments. The refill switch may be ON when the refill lid is open, according to various embodiments, as discussed further herein and above. The refill switch may not be ON and, therefore, a NO path 768 may be followed. In following the NO path, the flowchart 700 may return to or remain in the sleep mode in block 754. Accordingly, the pour switch ON decision block 758 and the refill switch ON decision block 766 may allow for a time period of when the container assembly 20 is not in use, either for refilling and/or for pouring and the system, such as the electronics package including the processor module, may be maintained in the sleep mode in block 754.

The pour switch may also or alternatively be determined to be ON in block 758 and/or the refill switch may be determined to be ON in block 766. The refill switch may be used to determine whether a refill is occurring or has occurred and may be used to determine a count for determination of the refill counts that are compared to the recalled refill counts from block 734, 736. Accordingly, the refill switch ON determination in block 766 may follow a YES path 770 when the refill switch is on. The refill switch ON Yes determination may then follow to a further refill switch ON greater than period in block 774. The period in block 774 may be any appropriate time, such as greater than about 5 seconds, greater than about 10 seconds, or greater than about 20 seconds, or any appropriate time. Generally, the period may be selected to determine that an effective or actual refill is occurring. If it is determined that the refill switch has not been on for greater than a selected period of time in block 744, a NO path 778 may be followed, again to return to the sleep mode in block 754.

A YES path may alternatively be followed in 782 to a refill count plus one (in other words increasing the refill count by one) in block 784. The refill count plus one may be saved and added to the system, such as stored in the memory 210, for comparing to the recalled refill counts in block 734, 736. Each time the refill switch is ON and determined to be greater than a selected period in block 766, 774, respectively, the refill count plus one may be added in block 784, which may be stored for a later recall in comparison to the recalled refill counts. Thus, the system, including the processor module 158 executing selected instructions, may count refills of the container assembly through the lid assembly 28.

The selected number of refill counts may be used for providing an indication to the user, such as with the indicator 80. Thus, as discussed above, the pour switch ON determination in block 758 may be used to provide an indication to the user when a pour is happening. Accordingly, the determination of the pour switch ON in block 758 may be YES determination and follow YES path 788. When the pour switch is determined to be ON and the YES path 788 is followed, a determination of whether a refill count is less than a refill count threshold in block 792 may be made. As discussed above, the refill count may be increased by one in block 784 each time the refill switch is determined to be ON for a selected period of time. Accordingly, the refill count may be counted up each time a plus one is added in block 784. This refill count may then be compared to the selected values recalled in block 734 and 736. Thus, in the determination block 792 it may be determined whether the refill count is less than the recalled refill count threshold.

Figure 19:
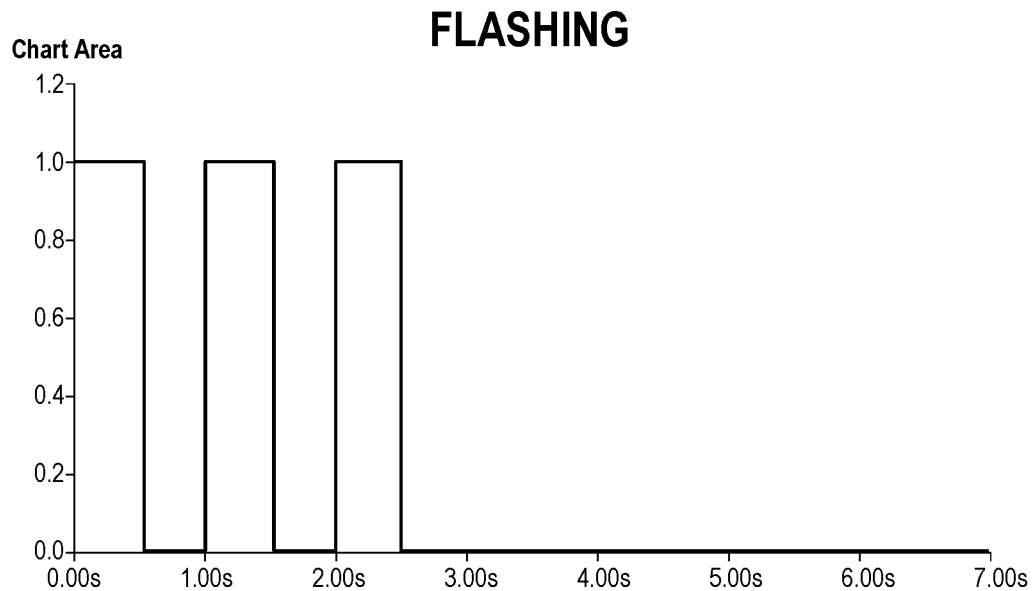
FIGS. 19-20 illustration flashing or pulsing patterns, according to various embodiments.

A determination of whether the refill count is less than the recalled refill count threshold may follow a NO path in block 796. The NO path 796 may go to an indication or powering of an LED in block 800. The LED powering in block 800 ma include powering a flash red LED in block 800 and may include a flashing red indicator 80 for a selected period of time, such as 3 seconds. A flashing signal may be powering and unpowering the LED for a selected period of time, as illustrated in FIG. 19. For example, when flashing the LED may be powered ON for a selected period of time, such about 0.5 seconds. The LED may then be powered off for a selected period of time, such as about 0.5 seconds. This may be repeated for a total period of time, such as 3 seconds, as illustrated in FIG. 19. Accordingly, the LED may flash and thus have an on and off light emission that may be viewed by the user at the indicator 80.

The red LED flash in block 800 may continue until a determination in block 804 of whether the pour switch is off. If a determination is made that the pour switch is not off, a NO path 806 may be followed to return to the sleep mode in block 754 and then a determination of whether the pour switch 758 is on may again be made. Accordingly, the flashing red LED may continue (such as pausing a selected period (e.g. one second) between flash cycles) as long as the determination is made and the pour switch remains on. The determination in block 804 may occur after a selected period of time of a determination that the pour switch is on, such as about 10 seconds, 15 seconds, or an appropriate period of time. A determination block 804 may also follow a YES path 810 that the pour switch is off.

The determination of whether the pour switch is off may follow the YES path 810 to a determination of whether the pour switch is ON for greater than 5 seconds in block 814. In determining that the pour switch is ON for greater than 5 seconds, a YES path 818 may be followed and the LED, such as a green LED, may be operated for a selected period of time, such as about 0.5 seconds after a selected delay, such as about a 2 second delay in block 820. The LED indication in block 820 may provide an indication to the user, such as through the indicator 80, that a selected pour has occurred. Thereafter, the NO or sleep path 806 may be followed to the entering the sleep mode 754 and awaiting a further action or signal. Further, a NO path 824 may be followed from the determination of whether the pour switch is ON for greater than 5 seconds or a selected period in block

814. Also, a NO path to an LED or indication in block 828 may be made which may include or sending a signal to operate or power a green LED for a selected period of time, such as about 0.5 seconds, after a selected delay which may be less than the delay in the block 820. Accordingly, the delay may be about 1 second to operate the LED. Then again the NO or sleep path 806 may be followed to reenter the sleep mode in block 754.

The refill count may be determined to be less than the refill count threshold determination block 792 may also follow a YES path 832. The YES path 832 may lead to a determination block 836 of whether the refill count is less than the refill count yellow indication from the selected or recalled block 734, 736. If the determination refill count less than the refill count yellow, a YES path 840 may be followed.

Figure 20:
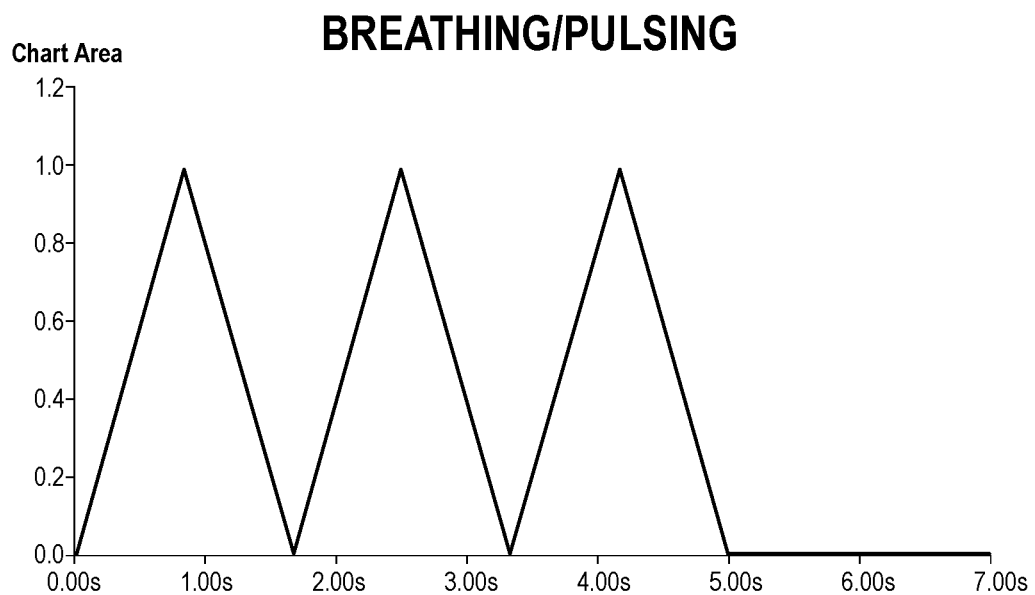

In following the YES path 840, a selected powering or LED indication may be made in block 844. The LED indication may be to have a selected LED or indication, such as a green LED, perform a breathing pulse for a selected period of time. For example, with reference to FIG. 20, a breathing pulse may be one that gradually increases and decreases an intensity of the LED over a selected period. For example, as illustrated in FIG. 20, the LED may gradually increase in brightness for a selected period of time, such as about 0.5 seconds. Thereafter, the LED may decrease in brightness for a selected period of time, such about 0.5 seconds. It is understood, however, that the period may be greater such about 0.2 to about 0.8 seconds. Accordingly, the pulsing or breathing may include a gradual increase and a gradual decrease including about 3 peaks over a period of about 5 seconds. In other words, the LED may be powered to breathe or pulse in block 844. Thereafter, the method 700 may continue to the decision block 804, and thereafter, as discussed above.

The refill count less than refill count yellow in block 836 may also follow a NO path 848 to an LED yellow breathing in block 852. The LED yellow may be any appropriate color that may differentiate from the red or green or other selected colors, as discussed above. Accordingly, the current discussion relating to a red LED or color, a green LED or color, or a yellow LED or color, is merely exemplary. It is understood that any appropriate number of colors may be provided and/or different colors, but that three colors may be provided for the different indications as discussed herein. Nevertheless, the exemplary LED yellow may also breathe as illustrated in FIG. 20. The selected color may differentiate from the green color, as discussed above, to provide an indication to the user during pouring that the filter is a selected amount through its lifespan or filter volume. After the LED breath Yellow in block 852, the method 700 may continue to the decision block 804, and thereafter, as discussed above.

Thus, if the refill count is not less than the refill count yellow, the yellow LED may breathe during the pour cycle. If the refill count is less than the yellow count, then the LED may breathe according to the green cycle in block 844. This allows the user to differentiate between the amount of remaining life span or use of the filter based upon the indication of the yellow or red breathing cycle. Further, the red flashing in block 800 may also indicate a different life span remaining of the filter.

The system executing the flowchart 700 can provide an indication to the user during pouring of a selected feature, such as a life span or refill count which may relate to a life span of the filter assembly. Also, as discussed above, once activated, a status of the system may be selected or evaluated. By actuating or providing a signal from one or more of the switches, such as the switches as discussed above, an indication may be provided to the user of a selected life span of the filter. The indicator 80 may provide a pour indication to the user. In addition thereto, however, various additional indications may also be provided, such as with selected refill LEDs or indicators 123, 125 (FIG. 4B). Accordingly, the user may operate one or more of the switches, such as the switch one referred to above and switch two referred to above. In various embodiments, for example, the switches may refer to different selected filter assemblies, such as a first or second filter assembly which may be positioned in the container assembly 20.

The switch 268 and/or the switch 272 may be operated as the first or second switch. In various embodiments, for example, as discussed above, switch one which may be switch 268 may be used to indicate a normal or first life filter assembly. In various embodiments the normal filter may filter a selected volume, such as about 20 gallons to about 80 gallons. The second switch 272 may indicate a second filter assembly. The second filter assembly may be a long life filter assembly which may filter a selected amount such as about 100 gallons to about 140 gallons. It is understood that the selected life spans or filter amounts are exemplary, and indicates that two or more types of filters may be provided and/or selected based upon the selected one or more of the switches that are activated. Accordingly, the discussion herein to switch one and switch two is exemplary and may refer to a specific filter assembly known to the user and that may be recalled relative to the electronics assembly 120 and the method 700.

According to the flowchart 700, the user may activate a switch and a signal may be selected or determined to be ON or OFF in block 870. If a determination that the switch is not ON in block 870 a NO path 874 may be followed to return to the sleep mode in block 754 and await a signal from one or more switches. If the switch is determined to be ON a YES path 878 may be followed to a determination of whether the on switch is ON for or longer than a selected period in block 882. If the selected switch is determined to be ON for more than a selected period a YES path 886 may be followed to the recall block 734. Accordingly, once activated, a selected recall might be added or reset once it is determined that the switch has been on or sending a signal for a selected period of time by following the YES path 886. Thus the switches, such as the switches 268, 272 may activate or be operated as resets for indicating that a new filter is added at any selected time. If the switch is determined to be ON for less than the period in block 882, a NO path 890 may be followed.

The second switch, such as the switch 272, may also be determined to be ON in block 894. If the determination is that the switch is not ON a NO path 898 may be followed to return to the sleep mode or awaiting a signal mode in block 754. If the switch is determined to be on, a YES path 902 may be followed to make a determination of whether the switch has been ON for a selected period in block 906. If it is determined that the switch has been ON for the selected period greater than the selected period, a YES path 910 may be followed to the recall in block 736. Accordingly, initializing the assembly for determination of the selected filter to recall the refill counts and/or set the refill counts in block 734, 736 may be made at any appropriate time while the system is activated, such as after initiation including the power connected in block 704 and/or after the system is activated in block 750.

If it is determined that the switch two has not been ON for greater than the period in block 906, the NO path 890 may also be followed. Accordingly, the NO path 890 may go or flow to a determination block 920 regarding a mode flag which may be based upon the selected one of the switches activated which may include a selection of either a normal or a long period. It is understood that the mode flags "normal" and "long" are merely exemplary, and may refer to a normal or selected filter volume and/or a second or larger filter volume. Accordingly, the determination from the mode flag in block 920 may follow a normal path 924 or a long path 926. Further, it is understood that the LEDs 125, 125 may indicate the different filters that may be selected. Thus, the user may perform a status check with any appropriate switch, such as either switch 272, 268, and the appropriate LED will indicate a life as noted below relative to the appropriate filter indication that was selected after the last reset.

When following the normal path 924, a first determination may be whether a refill count is greater than a refill threshold in block 930. If the determination is that the refill count is greater than a refill count threshold a YES path 934 may be followed to provide an indication in indication block 938. The indication may include operating the indicator 80, the light pipe 180, and/or the alternative LED, such as a specific status LED 123, 125 (e.g. depending upon the previously input or selected filter type) a selected amount, such as a red flash for three times. As discussed above, the flashing may include the on and off as illustrated in FIG. 19 and provide an indication to the user that the refill count is not greater than a refill count threshold and may provide an indication that the filter should be replaced. Thereafter, an enter sleep mode path 942 may be followed to return to the enter sleep mode at block 754.

In the determination block 930, if the refill count is not determined to be greater than a refill count threshold a NO path 948 may be followed. In following a NO path, a determination of whether the refill count is greater than the refill count yellow may be made in block 952. If a determination is made that the refill count is greater than a refill count yellow a YES path 956 may be followed. The YES path may be to an indication block or indication signal selection 958. The indication signal 958 may be to flash the yellow LED three times, according to the flash signal as illustrated in FIG. 19. A differentiation in color from the red flash in block 938 may provide a different indication to the user, such as the life span of the filter is nearing an end of life. After providing the indication in block 958 the return to the sleep mode in block 942 to block 754 may be followed.

Further, if the refill count is not determined to be greater than the refill count yellow, a NO path 962 may be followed to an indication block 964. In indication block 964 a green LED may flash three times, such as according to the flash sequence as illustrated in FIG. 19. After flashing green three times, the return to the sleep path 942 may be followed to the sleep block 754. Accordingly, a determination of whether the threshold count has been reached and the filter should be replaced may be indicated with a red flash, a determination of whether a yellow count or nearing end of life count may be made in a yellow LED may be flashed, or a determination that neither of the thresholds or yellow counts has been reached and the green flash may be made. Thus, an indication to a user of a selected amount of life span of the filter may be made based upon an input from a user, such as selecting switch one or switch two.

The long path 926 may also or alternatively be followed. In following the long path a similar process, which may refer to the long mode recall thresholds in block 736, may be made in block 970. The determination in block 970 may be whether the refill count is greater than a refill count threshold. If a determination that the refill count is greater than the refill count threshold a YES path 974 may be followed to an indication 978. The indication in block 978 may be the red flash similar to that as discussed above. It is understood that the refill or red flash 978 may be with a different LED than the red flash in block 938 to provide a separate indication to the user. Alternatively and/or additionally, the user in selecting the different button may also understand the in differentiation between the long and normal selection.

Further, a refill count greater than the refill count threshold determination may also follow a NO path 982 to a further determination of whether a refill count is greater than the refill count yellow in block 986. A determination may be made that the refill count is greater than the refill count yellow and a YES path 990 may be followed. The YES path 990 may go to an indication block 994 where a yellow LED flashes according to the flash cycle as illustrated in FIG. 19. The LED flash in 994 may be different than the LED flash in 958 including at a different LED and/or due to the indication or selection of the second switch.

Further, the refill count greater than refill count yellow may also be determined to not have occurred and a NO path 996 may be followed to an indication block 998. If the NO path is followed 996 to the indication block 998, the green LED may flash according to the flash cycle, as illustrated in FIG. 19. After flashing or providing indications in any of the indication blocks 978, 994, 998, the return to the sleep mode along path 942 may be followed. As discussed above, the sleep mode may include a sleep or awaiting a further instruction or signal according to any appropriate embodiment.

According to the flowchart 700, the indications may be physical acts (e.g. viewing or powering the LED) or may be a process performed by the processor 158. The process performed by the processor 158 may be based on the determination, generate a signal. The signal may be an indication signal that is transmitted to operate an indicator, such as to power the LED 150. As discussed above, the LED may illuminate in more than one color. Thus, the LED 150 may be a multiple color LED.

Accordingly, the flowchart 700 may include a method or instructions that are executed by the processor module 158 to provide indication to the user. The indication to the user may be based upon a selection by the user either with a switch selection and/or during pouring from the container assembly 20. Thus the user may be provided with an indication of a selected feature, such as a remaining life of the filter assembly. The remaining life of the filter assembly may be based upon a number of fill count as discussed above.

Instructions may be executed by a processor and may include may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C #, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

A processor or module or 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Further, various embodiments may be combined with others as disclosed herein and as understood by one skilled in the art.

The terminology used herein is for the purpose of describing particular example embodiments only and is not intended to be limiting. As used herein, the singular forms "a," "an," and "the" may be intended to include the plural forms as well, unless the context clearly indicates otherwise. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system to provide an indication to a user regarding a use of a filter assembly, comprising:
   an indicator assembly including an indicator configured to provide an indication to a user;
   a first sensor including a light sensor configured to sense an ambient light via an ambient light aperture when a fill lid of the system is moved to an open position to open a fill opening and the ambient light aperture, and generate a first signal in response to the ambient light being sensed, wherein the first signal is operable to determine a state of a filter within the system;
   a second sensor configured to generate a second signal regarding a state of a container assembly that is movable between a first state and a second state; and
   a processor module configured to execute instructions to:
   determine the state of the filter based at least on the first signal,
   determine the state of the container assembly, and
   cause the indicator to provide the indication based on the state of the filter during at least the second state of the container assembly.

2. The system of claim 1, wherein the indicator is configured to emit at least a first color of visible light and a second color of visible light.

3. The system of claim 2, wherein the first color of visible light correlates to a first state of the filter and the second color of visible light correlates to a second state of the filter.

4. The system of claim 1, further comprising:
   a light emitting member; and
   a light pipe extending from the light emitting member, wherein the indicator is a portion of the light pipe that extends through the container assembly.

5. The system of claim 1, wherein the indicator assembly further comprises:
   a light emitting assembly; and
   a light pipe member configured to direct light emitted from the light emitting assembly to a viewing area.

6. The system of claim 5, wherein the light emitting assembly includes a light emitting diode.

7. The system of claim 5, wherein the light pipe member includes at least a first section and a second section;
   wherein the second section is positioned near a pour spout of the container assembly.

8. The system of claim 7, wherein the second section is less than about three millimeters from the pour spout.

9. The system of claim 5, wherein the light pipe member is positioned and configured to direct an emitted light into a stream of a liquid passing through a pour spout of the container assembly.

10. The system of claim 1, wherein:
the container assembly further comprises a top lid; and
the indicator is sealed relative to at least one of the top lid or the fill lid.

11. The system of claim 10, wherein the first sensor is configured to sense when the fill lid is moved to the open position relative to the top lid and includes at least one of a Hall effect sensor, a physical switch, an electrical switch, or combinations thereof.

12. The system of claim 1, wherein the processor module determines the state of the filter based upon a number of times the ambient light is sensed during a predetermined period of time compared to a predetermined number of light senses.

13. The system of claim 1, wherein the processor module determines the state of the filter based upon a number of times the fill lid is sensed open compared to a predetermined number of fill lid open senses.

14. The system of claim 1, wherein:
the second sensor is a tilt sensor; and
the processor module is configured to determine the state of the container assembly based upon an angle sensed by the tilt sensor.

15. A system to provide an indication to a user regarding a use of a filter assembly, comprising:
a container assembly comprising a container member, a top lid, and a fill lid;
a filter assembly including a filter configured to filter a liquid placed in the container member;
an indicator assembly including an indicator configured to provide an indication to a user;
a first sensor including a light sensor configured to sense an ambient light via an ambient light aperture when the fill lid is in an open position relative to the top lid to open a fill opening and the ambient light aperture, and generate a first signal in response to the ambient light being sensed, the first signal operable to determine a state of the filter;
a second sensor configured to generate a second signal regarding a state of the container member, which is movable between a first state and a second state; and
a processor module configured to execute instructions to:
determine the state of the filter based at least on the first signal,
determine the state of the container member, and
cause the indicator to provide the indication based on the state of the filter during at least the second state of the container member.

16. The system of claim 15, wherein the first sensor, the second sensor, and the processor module are provided in an electronics unit that is fixed to the top lid.

17. The system of claim 16, wherein the top lid is configured to be mounted to the container member.

18. The system of claim 15, wherein the processor module counts a number of times the first sensor generates the first signal to determine the state of the filter.

19. The system of claim 18, wherein:
the second sensor is configured to sense a pouring of a fluid from the container member;
the processor module generates an indicator signal to cause the indicator to provide the indication based on a count of a number of times the first sensor generates the first signal; and
the indication includes an emission of visible light.

20. A method to provide an indication to a user regarding a selected parameter of a filter assembly included in a container assembly, comprising:
storing a selected parameter of a filter included in the filter assembly, the selected parameter being indicative of a state of the filter;
sensing an occurrence of ambient light via an ambient light aperture when a fill lid covering the filter assembly is moved to an open position to open a fill opening of the container assembly and the ambient light aperture;
transmitting a signal regarding the sensed occurrence to a processor module;
determining an indication signal based on the transmitted signal and the stored selected parameter;
determining a state of the container assembly based on a second signal from a second sensor configured to sense the state of the container assembly; and
upon determining, based on the second signal, that the container assembly is in an active state, operating an indicator based on the indication signal.

21. The method of claim 20, wherein the selected parameter includes a filter capacity of the filter.

22. The method of claim 21, wherein sensing the occurrence relative to the stored parameter includes sensing the ambient light when the fill lid in the open position relative to a top lid for a set period of time.

23. The method of claim 22, wherein determining the indication signal based on the transmitted signal and the stored parameter includes:
determining a number of ambient light senses; and
comparing the number to the stored parameter.

24. The method of claim 23, wherein determining the indication signal further comprises selecting at least one user perceivable indication regarding the stored parameter of the filter.

25. The method of claim 20, wherein the second sensor comprises a tilt sensor and the method further comprises:
determining that the container assembly is in the active state based on the tilt sensor connected to the container assembly.

* * * * *